United States Patent [19]
Ishihara et al.

[11] Patent Number: 6,021,135
[45] Date of Patent: Feb. 1, 2000

[54] CELL ASSEMBLY AND MULTIPLEXING DEVICE, AND DEMULTIPLEXING DEVICE

[75] Inventors: Tomohiro Ishihara; Hideaki Ono; Tsuguo Kato; Ryuichi Takechi, all of Kawasaki, Japan

[73] Assignee: Fujitsu Limited, Kanagawa, Japan

[21] Appl. No.: 08/957,289

[22] Filed: Oct. 24, 1997

[30] Foreign Application Priority Data

Dec. 12, 1996 [JP] Japan ..................... 8-332319

[51] Int. Cl.⁷ ............... H04J 3/02; H04L 12/56
[52] U.S. Cl. ........................... 370/474; 370/356
[58] Field of Search .................. 370/352, 353, 370/354, 356, 474, 475, 476, 395

[56] References Cited

U.S. PATENT DOCUMENTS 5,287,348  2/1994  Schmidt et al. ................. 370/352
5,301,189  4/1994  Schmidt et al. ................. 370/356
5,774,469  6/1998  Wirkestrand ................... 370/473
5,805,588  9/1998  Petersen ....................... 370/474

FOREIGN PATENT DOCUMENTS 5-211523  8/1993  Japan .
5-227197  9/1993  Japan .
7-336354  12/1995  Japan .

*Primary Examiner*—Min Jung
*Attorney, Agent, or Firm*—Helfgott & Karas, P.C.

[57] ABSTRACT

A cell assembly and multiplexing device includes short cell assembly parts which store input information received via respective input lines and add short cell headers to the input information so that short cells having the short cell headers are assembled, and a multiplexing part which arranges the short cells in given fields of standard cells having a given standard format and a fixed cell length and outputs the standard cells having the short cells to a transmission line.

13 Claims, 28 Drawing Sheets

CELL ASSEMBLY AND MULTIPLEXING DEVICE, AND DEMULTIPLEXING DEVICE

BACKGROUND OF THE INVENTION

1. Field of the Invention

The present invention generally relates to communications in an ATM (Asynchronous Transfer Mode), and more particularly to multiplexing and demultiplexing of a short cell suitable for a low-bit-rate transfer of information, such as compressed and encoded voice information.

In a communication in the ATM, information is provided in a payload field of an ATM cell and is transferred. The ATM cell is assigned identification information for each connection. The identification information includes a VPI (Virtual Path Identifier) and a VCI (Virtual Channel Identifier). In other words, one ATM cell to be transferred over an ATM transmission line has information concerning one connection.

The ATM transfer can be realized in a mobile communication system using a radio wave. In such a mobile communication system, information to be transmitted is compressed and encoded in order to efficiently utilize the communication band. For example, compressed and encoded information has a bit rate of, for example, 8 kbps. If such a low-bit-rate information is transferred by using the ATM cell, it will take a very long time to assemble and send one ATM cell. This greatly degrades the advantages of the ATM transfer. The ITU-T has studied an improved transfer method directed to overcoming the above problem. For example, a short cell (having a length shorter than the fixed length of the ATM cell) is provided in an ATM cell to reduce the time necessary to assemble the ATM cell.

When such a short cell is used, an ATM switch is required to enable switching the short cell so that the short cells multiplexed in one ATM cell or two consecutive ATM cells can be switched. Hence, a conventional ATM switch cannot switch the short cells. However, it is economically advantageous to utilize a conventional ATM switch if the conventional ATM switch can be modified so as to switch the short cells. If the conventional ATM switch is used, it will be necessary to convert an ATM cell in which a short cell is multiplexed into a standard ATM cell. It is required that a device which processes information concerning the short cells be capable of extracting only a short cell relating to a call to be processed from the ATM cells in which the short cells are multiplexed.

FIG. 1 is a diagram shown a format of the ATM cell and a format of the short cell. In the following description, the term "ATM cell" denotes the standard ATM cell having a fixed length of 53 bytes (octets). The ATM cell consists of a payload field of 48 bytes, and a header (ATM cell header) of 5 bytes. The payload is used to store user information (data), and the header is used to store various control information. The header includes information PTI (Payload Type Identifier), CLP (Cell Loss Priority) and HEC (Header Error Control).

The short cell includes a short cell header (which can be referred to as a control information field (CIF), and a short-cell payload field. The short cell is allowed to have an arbitrary length. For example, the short cell header consists of 2 bytes, and includes information concerning a connection identifier (which is also called a logical link number (LLN)), a length identification (LI), and spare (reserved) bits. Although not shown in FIG. 1, the short cell has an error correction field (ECF). The length of the payload field of the short cell is indicated by the length indication LI.

FIG. 2 shows an arrangement in which user information to be transferred using short cells (to be provided in the short-cell payload area) extends over two consecutive ATM cells. Data #1 of user #2 extend over two consecutive cells. Hence, the logical link number LLN of the short cell in the ATM cell which is illustrated on the left side and is used to transfer information #1 of user #2 is the same as that of the short cell in the ATM cell which is illustrated on the right side and is used to transfer information #1 of user #2 (LLN=2).

FIG. 3 is a block diagram of a conventional cell assembly and multiplexing device having the function of assembling the short cells. The structure shown in FIG. 3 is obtained by applying the conventional assembling and multiplexing method for the standard ATM cells to the assembling and multiplexing of the short cells without a substantial modification. There are provided input lines #1–#4. Input information (such as voice packets) transferred over input lines #1–#3 is assembled into short cells. The short cells on the input lines #1–#3 are multiplexed to form the ATM cell (standard ATM cell), which is then multiplexed with input information received via the input line #4.

More particularly, short cell assembly parts $10_1$, $10_2$ and $10_3$ are provided in the input lines #1–#3, and assign short cell headers CIF to respective input information. The short cell assembly parts $10_1$, $10_2$ and $10_3$ respectively have buffer memories used to buffer input information to be transferred. A short cell multiplexer 11 multiplexes the short cells from the short cell assembly parts $10_1$–$10_3$, and outputs multiplexed short cells to a single line. The short cell multiplexer 11 has buffer memories respectively provided to the input lines #1–#3, which respectively buffer the short cells in order to allow a selector provided therein to select one of the short cells from the short cell assembly parts $10_1$–$10_3$.

A standard ATM cell assembly part 12 assemblies the received short cells into the ATM cells each having the 48-byte payload field, and adds the 5-byte ATM header to each ATM cell. A buffer memory provided in the standard cell assembly part 12 is used to buffer the short cells to enable the above operation of the part 12.

A standard cell multiplexer 13 selectively outputs the ATM cells from the part 12 and a buffer memory $10_4$ provided to the input line #4. This operation of the multiplexer 13 can be realized by using buffer memories respectively provided to the part 12 and the buffer memory $10_4$ and a selector.

The structure shown in FIG. 3 has a disadvantage in that input information transferred over the input lines #1–#3 passes through four stages of the buffer memories until it is output to the output line extending from the standard cell multiplexer 13. For example, input information on the input line #1 are buffered in the buffer memories of the short cell assembly part $10_1$, the short cell multiplexer 11, the standard cell assembly part 12 and the standard cell multiplexer 13 in this order. The structure having the four stages of buffer memories has a large hardware scale.

Further, there is nothing which makes it possible to extract the short cells from the multiplexed ATM cells. Hence, it is impossible to employ multiplexing and demultiplexing of the short cells in practical systems.

SUMMARY OF THE INVENTION

It is a general object of the present invention to overcome the above disadvantages.

A more specific object of the present invention is to provide a cell assembly and multiplexing device having a reduced number of buffer memories and to provide a cell demultiplexing device capable of extracting short cells from a multiplexed signal.

The above objects of the present invention are achieved by a cell assembly and multiplexing device comprising: short cell assembly parts which store input information received via respective input lines and add short cell headers to the input information so that short cells having the short cell headers are assembled; and a multiplexing part which arranges the short cells in given fields of standard cells having a given standard format and a fixed cell length and outputs the standard cells having the short cells to a transmission line.

The cell assembly and multiplexing device may be configured so that the multiplexing part includes a selector which selects one of the short cell assembly parts without buffering the input information.

The cell assembly and multiplexing device may be configured so that it further comprises a process part which is provided to another input line and arranges information received via the another input line so that standard cells including the information can be formed, wherein the multiplexing part multiplexes the standard cells assembled in the process part with the standard cells including the short cells.

The cell assembly and multiplexing device may be configured so that the multiplexing part multiplexes standard cells transferred over another input line and stored in a buffer with the standard cells including the short cells.

The cell assembly and multiplexing device may be configured so that the short cell assembling parts assemble the short cells for each channel multiplexed in each of the input lines in a time division multiplexing formation.

The cell assembly and multiplexing device may further comprise a switch part which is provided at input sides of the short cell assembly parts and switches time slots multiplexed on the input lines in a time division multiplexing formation so that information in each of the time slots is applied to a corresponding one of the short cell assembly parts.

The cell assembly and multiplexing device may further comprise a multiplexer which is provided at input sides of the short cell assembly parts and multiplexes time slots that are multiplexed on the input lines in a time division multiplexing formation.

The cell assembly and multiplexing device may be configured so that the multiplexing part arranges the short cells in the given fields of standard cells in a given priority order.

The above objects of the present invention are also achieved by a short cell demultiplexing device comprising: a short cell discriminating part which discriminates a short cell arranged in a standard cell having a given standard format and transferred via a transmission line by referring to a short cell header of the short cell; and a short cell extracting part which extracts, from at least one standard cell, the short cell discriminated by the short cell discriminating part.

The short cell demultiplexing device may be configured so that the short cell extracting part comprises: a short cell memory which stores the short cell arranged in at least one standard cell and discriminated by the short cell discriminating part; a write controller which performs a write control of the short cell memory; and a read controller which performs a read control of the short cell memory.

The short cell demultiplexing device may further comprise a connection setting memory which stores information concerning a connection which is set for each call, wherein the write controller performs the write control of the short cell memory when connection setting information included in a header of the standard cell applied to the short cell discriminating part coincides with the information stored in the connection setting memory.

The short cell demultiplexing device may further comprise an error check part which determines whether a given continuity of standard cells received is satisfied and concludes that an error of a transfer of the standard cells occurs if it is determined that the given continuity is not satisfied.

The short cell demultiplexing device may further comprise a cell assembly part which arranges the short cell read from the short cell memory in a given field of a standard cell to be output from the short cell demultiplexing device.

The short cell demultiplexing device may further comprise a cell assembly part which arranges the short cell read from the short cell memory in a given field of a standard cell to be output from the short cell demultiplexing device by referring to control information necessary to arrange the short cell in the cell assembly part, the control information relating to the information concerning the connection which is set for each cell and stored in the connection setting memory.

The short cell demultiplexing device may further comprise: an overlap detection part which detects a short cell which extends over two standard cells; and a control part which controls the write controller and the read controller so that separated parts of the short cell detected by the overlap detection part are successively written into the short cell memory and read therefrom.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 4:
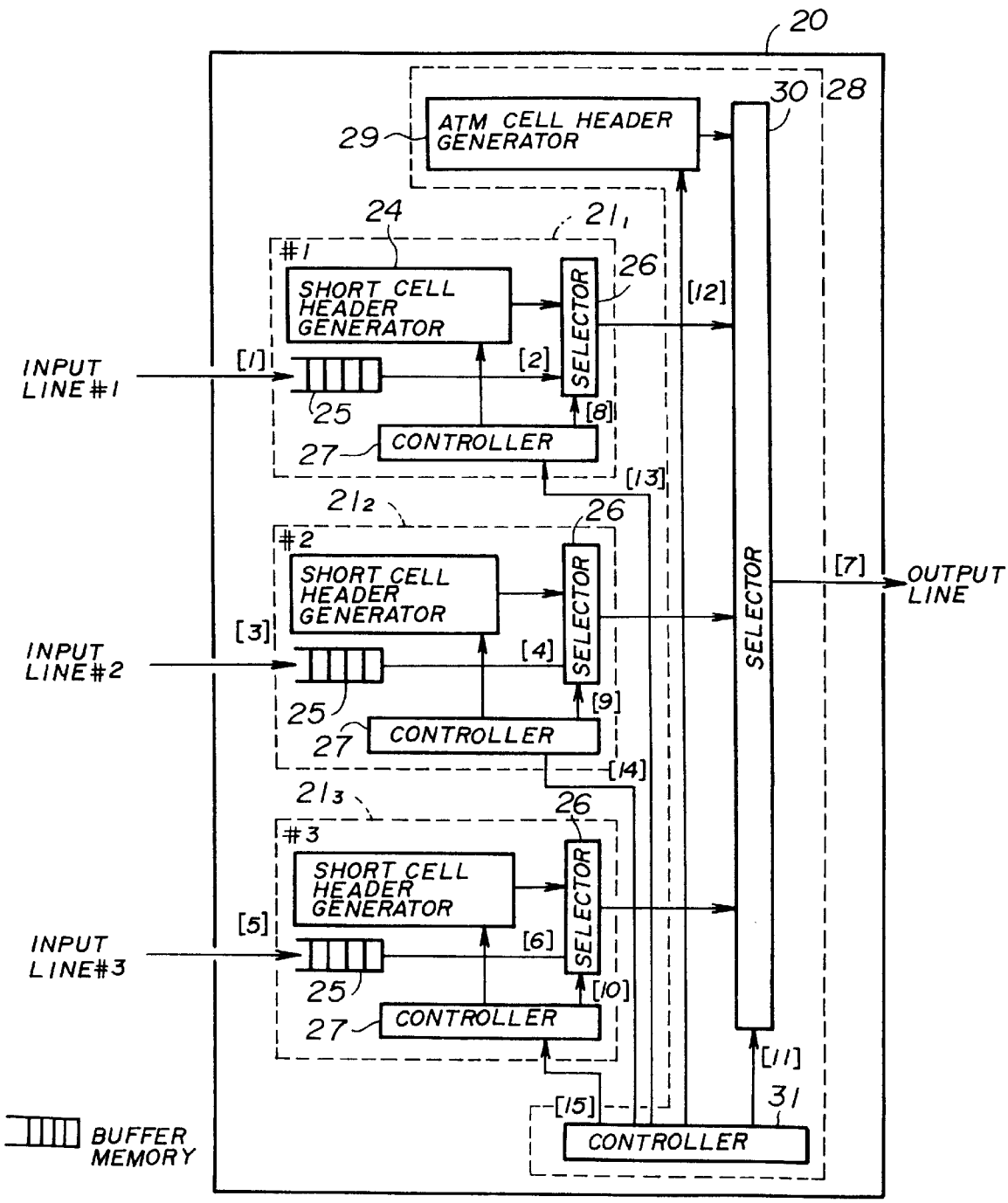
FIG. 4 is a block diagram of a short cell assembly and multiplexing device according to a first embodiment of the present invention.

FIG. 4 is a block diagram of a cell assembly and multiplexing device 20 according to a first embodiment of the present invention. The device 20 shown in FIG. 4 accommodates three input lines #1–#3, but can accommodate an arbitrary number n of input lines. The device 20 shown in FIG. 4 is directed to realizing assembling of short cells and multiplexing thereof by means of a single-stage buffer memory.

The device 20 includes short cell assembly parts $21_1$, $21_2$ and $21_3$ respectively provided to the input lines #1–#3, and a multiplexing part 28 which multiplexes output signals of the parts $21_1$–$21_3$. The short cell assembly part $21_1$ includes a short cell header generator 24, a buffer memory 25, a selector 26 and a controller 27. The other short cell assembly parts $21_2$ and $21_3$ are configured in the same manner as the short cell assembly part $21_1$. The multiplexing part 28 includes an ATM cell header generator 29, a selector 30 and a controller 31.

When the short cell assembly parts $21_1$–$21_3$ assemble short cells, necessary headers are generated by respective short cell header generators 24. Buffer memories 25 respectively provided in the short cell assembly parts $21_1$–$21_3$ buffer information transmitted over the input lines #1–#3. Selectors 26 respectively provided in the short cell assembly parts $21_1$–$21_3$ select the headers from the short cell header generators 24 or information buffered in the buffer memories 25. The selectors 26 are controlled by respective controllers 27, each of which counts the number of octets and selects either the short cell header generator 24 or the buffer memory 25 on the basis of the count value. The basic structure of the short cell assembly part $21_1$ is the same of the conventional cell assembly part except that the sequence of the controller 27 is different from the conventional sequence. The controller 27 makes it possible to assemble the short cells and generate the existing AAL format. This is based on the fact that the basic process for adding the header to user information is common to the standard ATM cell and the short cell. In other words, the structure of the short cell assembly part $21_1$–$21_3$ has a capability of generating the standard ATM cells. In this case, the short cell header generator 24 generates the ATM cell headers.

The multiplexing part 28 multiplexes the short cells and multiplexes the standard ATM cells. Further, the multiplexing part 28 multiplexes the short cells and the standard ATM cells. Further, the multiplexing part 28 has an ATM cell header generator 29, which has the function of adding the cell headers to the standard ATM cells. A selector 30 of the multiplexing part 28 selects one of the input lines #1–#3 and the ATM cell header generator 29 under the control of a controller 31. The controller 31 counts the number of octets and determines which one of the inputs should be selected on the basis of the count value. When the count value indicates the first five octets, the controller 31 controls the selector 30 to select the ATM cell header generator 29. Thus, the ATM cell header is output to an output line extending from the device 20. If the count value indicates a numeral other than the above, the controller 31 controls the selector 30 to select one of the input lines #1–#3.

The controller 31 requests the controller 27 of the cell assembly part (for example, $21_1$) selected by the controller 31 to send data to the selector 30. In response to the above request, the short cell assembly part $21_1$ assembles the short cell or standard ATM cell. If the short cell assembly part $21_1$ assembles the standard AAL (any of AAL1 to AAL5 defined in the I.362 and I.363 Recommendations of the ITU-T, the disclosure of which is hereby incorporated by reference), it outputs information on the 48-octet base.

Figure 5:
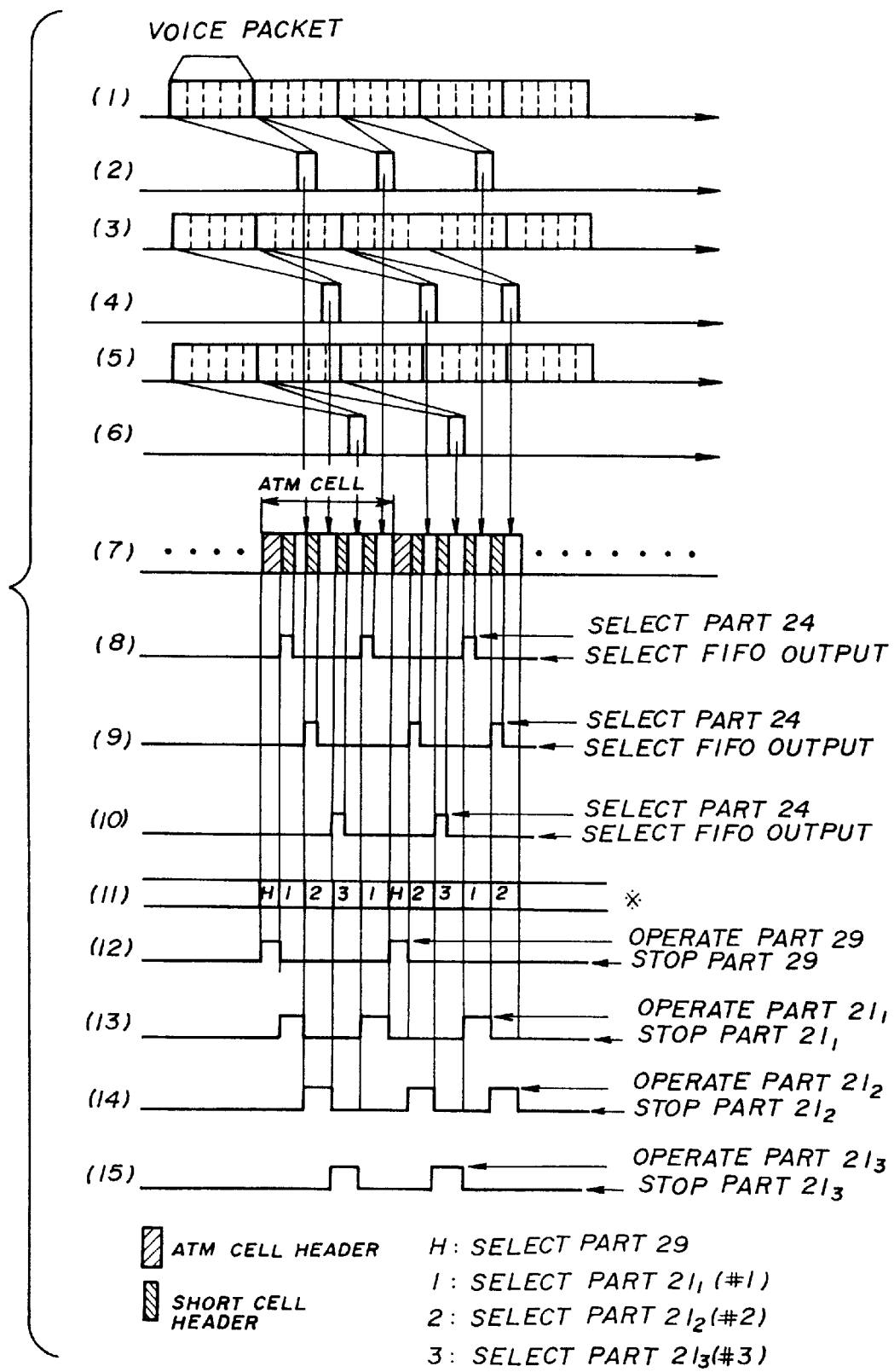
FIG. 5 is a timing chart of an operation of the device shown in FIG. 4.

FIG. 5 is a timing chart showing an operation of the cell assembly and multiplexing device 20 shown in FIG. 4, respectively. Parts (1) through (15) of FIG. 5 show signals obtained at nodes [1] through [15] shown in FIG. 4. Voice packets [1], [3] and [5] respectively transferred over the input lines #1, #2 and #3 are stored in the buffer memories 25 of the short cell assembly parts $21_1$, $21_2$ and $21_3$. Then, the voice packets [1], [3] and [5] are read, as data [2], [4] and [6], from the buffer memories of the parts $21_1$, $21_2$ and $21_3$ at different timings defined by a control which will be described later. The data [2], [4] and [6] read from the buffer memories 25 are finally transmitted to the output line as ATM cells [7]. The voice packets include voice data which is transferred in predetermined channels (time slots) and is multiplexed in the time division multiplexing formation.

The controller 31 of the multiplexing part 28 sends an operation control signal [12] to the ATM cell header generator 29, and sends operation control signals [13], [14] and [15] to the short cell assembly parts $21_1$ (#1), $21_2$ (#2) and $21_3$ (#3). The operation control signals [12]–[15] have different timings, and the high and low levels of each thereof correspond to "enable" and "disable", respectively. The short cell assembly parts $21_1$–$21_3$ are enabled by the operation control signals [13]–[15], respectively.

The short cell assembly parts $21_1$, $21_2$ and $21_3$ respectively receive the operation control signals [13], [14] and [15], and generate respective selection signals [8], [9] and [10] at different timings. The selectors 26 select the respective short cell header generators 24 when the selection signals [8], [9] and [10] are high, and select the respective buffer memories 25 when the selection signals [8], [9] and [10] are low. The controllers 27 control the respective selectors 26 so that the selectors 26 select the respective short cell header generators 24 first, and select the buffer memories 25 second. When the short cell header generators 24 are selected, the short cell headers generated thereby are allowed to pass through the selectors 26, and are then applied to the selector 30 of the multiplexing part 28. When the buffer memories 25 are selected, the data read therefrom are allowed to pass through the selectors 26, and are then applied to the selector 30. The short cells thus assembled are applied to the selector 30. When the operation control signals [13], [14] and [15] are low, the selectors 26 do not select the buffer memories 25 even if the selection signals [8], [9] and [10] are low.

The controller 31 of the multiplexing part 28 outputs a selection signal [11] to the selector 30 in synchronism with the operation control signals [12]–[15]. The selector 30 selects the ATM cell header generator 29, the short cell assembly parts $21_1$, $21_2$ and $21_3$ in the order specified by the controller 31.

It can be seen from the above, only a single stage of buffer memories is required to assemble and multiplex the short cells, because the assembling and multiplexing of short cells are concurrently carried out.

Figure 1:
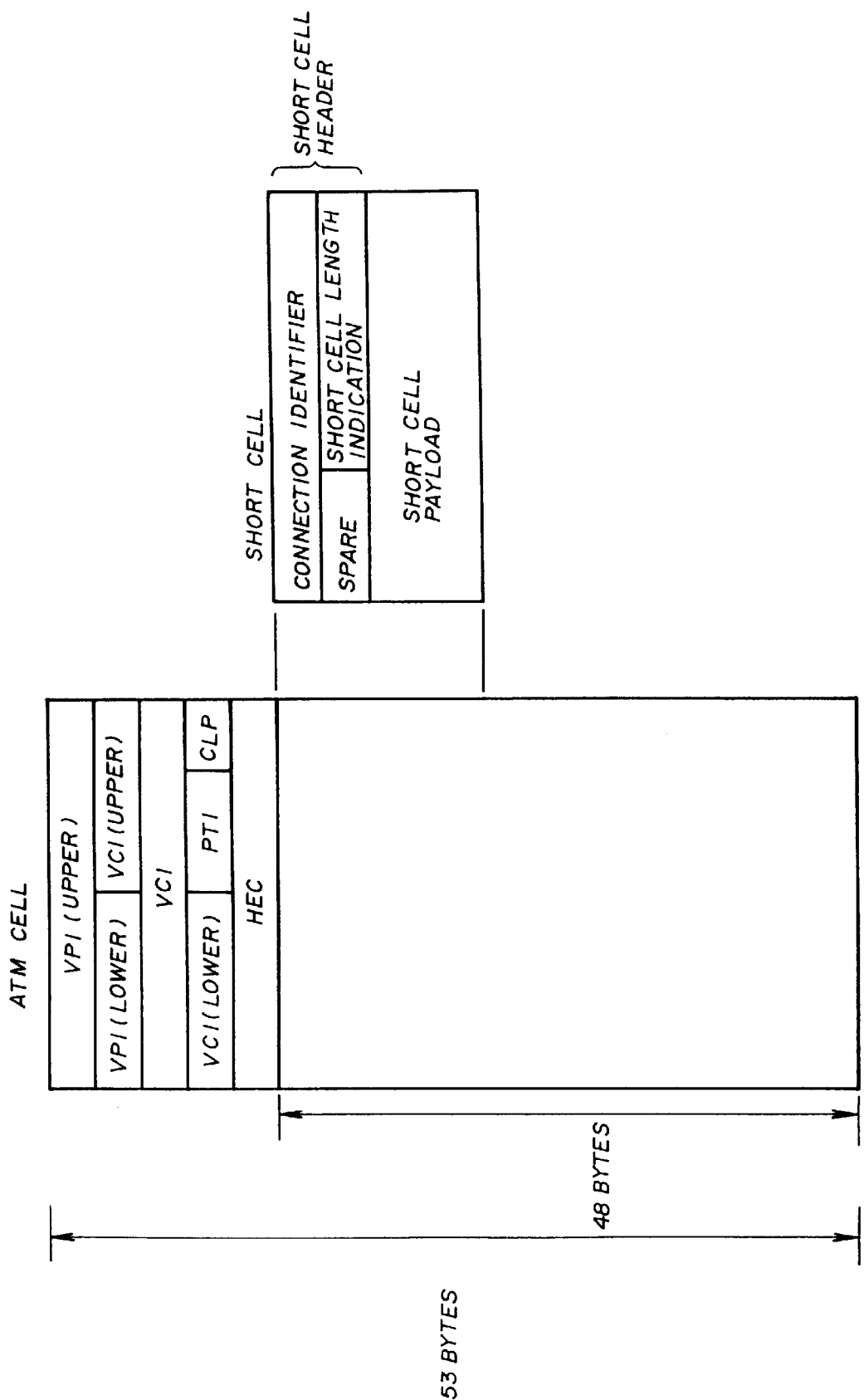
FIG. 1 is a diagram of a format of the ATM cell and a format of the short cell.
Figure 2:
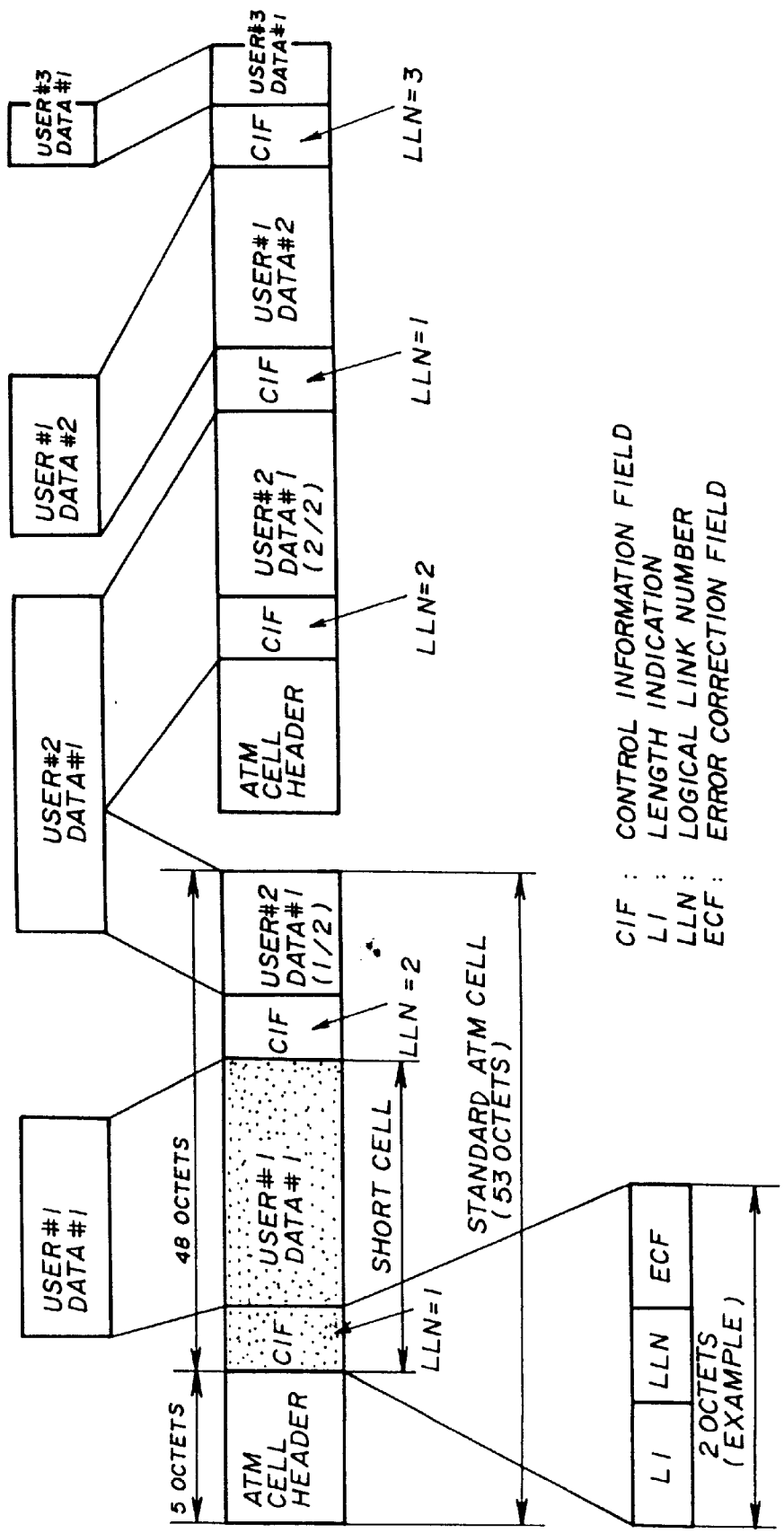
FIG. 2 is a diagram showing that a short cell extends over two consecutive ATM cells.
Figure 3:
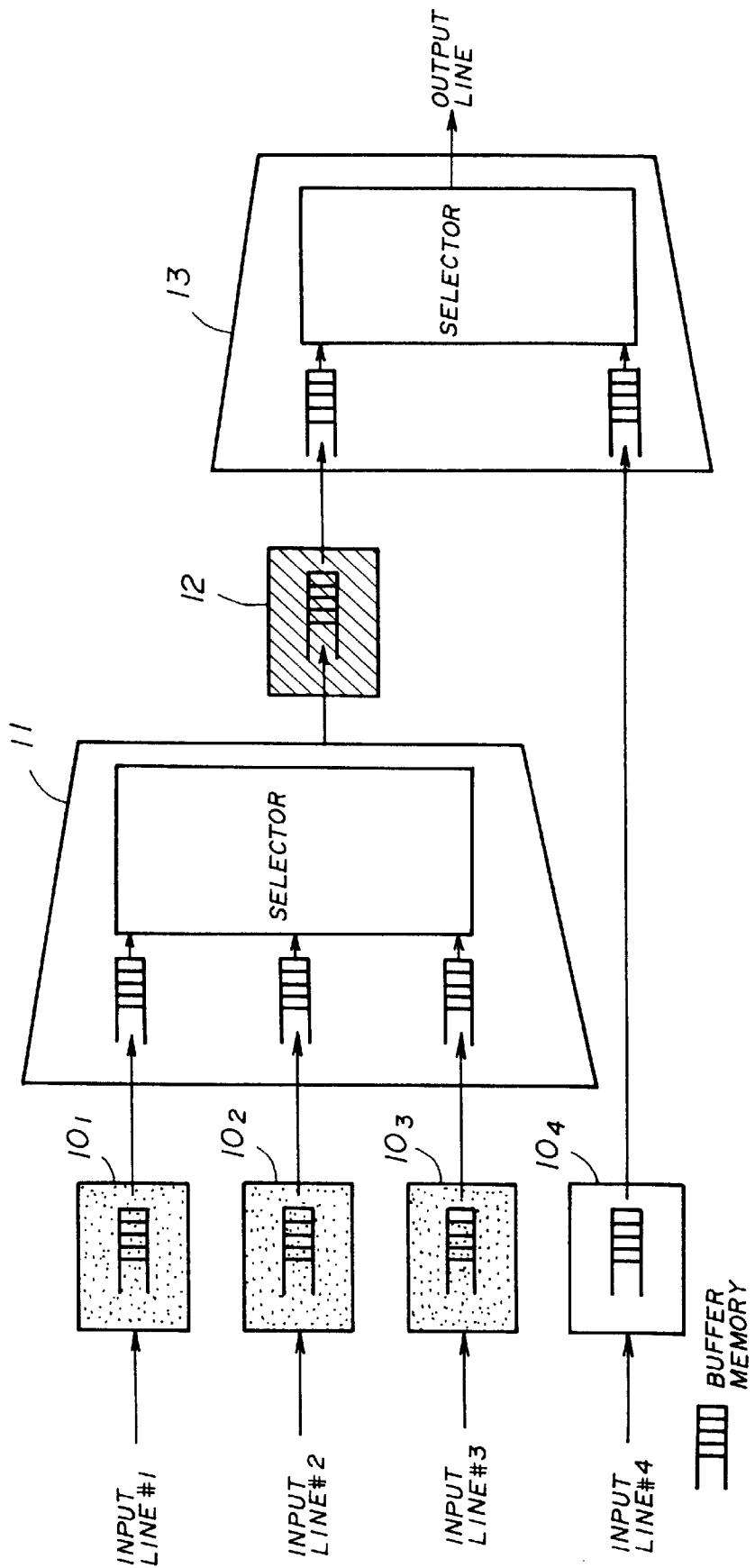
FIG. 3 is a block diagram of a conventional cell assembly and multiplexing device having a short cell assembly function.

If one short cell extends over two consecutive ATM cells, as shown in FIG. 2, the short cell header generators 24 assign, under the control of the controller 27, an identical short cell connection number (LLN) to two parts of information extending over two ATM cells.

Figure 6:
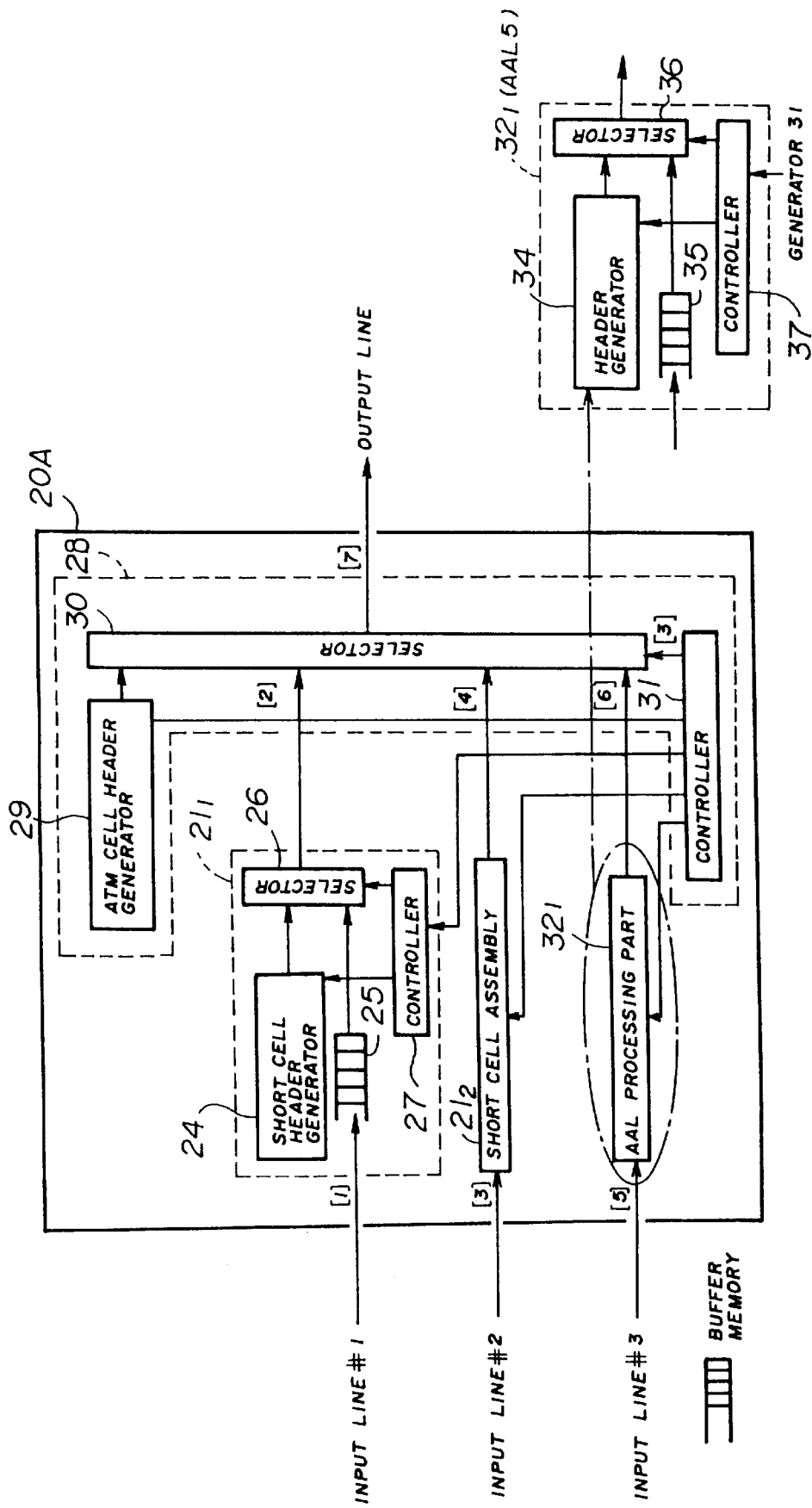
FIG. 6 is a block diagram of a short cell assembly and multiplexing device according to a second embodiment of the present invention.
Figure 7:
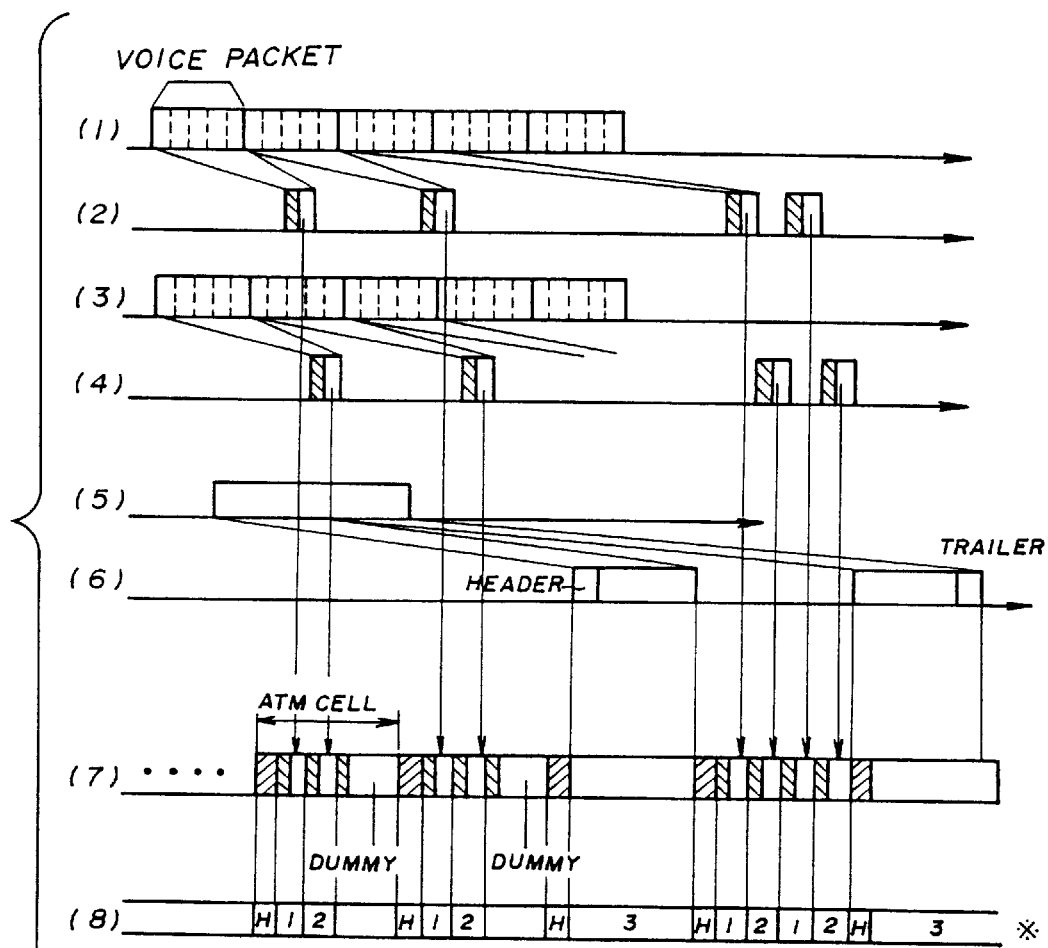
FIG. 7 is a timing chart of an operation of the device shown in FIG. 6.

A description will now be given, with reference to FIGS. 6 and 7, of a cell assembly and multiplexing device according to a second embodiment of the present invention. FIG. 6 is a block diagram of a cell assembly and multiplexing device 20A according to the second embodiment of the present invention, and FIG. 7 is a timing chart of an operation of the device 20A. The device 20A is directed to realizing assembling and multiplexing of short cells and standard AAL-format packets (48-byte user information) by means of only a single stage of buffer memories. In FIG. 6, an AAL processing part $32_1$ is provided instead of the short cell assembly part $21_3$ shown in FIG. 4. The AAL processing part $32_1$ conforms with the protocol of the AAL layer, and segments user information into 48-byte blocks (referred to as packets).

As shown in FIG. 6, the AAL processing part $32_1$ includes a header generator 34, a buffer memory 35, a selector 36 and a controller 37. The above structure of the AAL processing part $32_1$ is the same as that of the short cell assembly part $21_1$. User information transferred over the input line #3 is temporarily stored in the buffer memory 35. Under control of the controller 37, the selector 36 selects a header generated by the header generator 34, and then selects information read from the buffer memory 35. The header conforms with, for example, the AAL type 5 formation. In this manner, the cells which conform with the AAL standard format can be assembled. If trailers are added to user information, trailers generated by the header generator 34 are added to user information read from the buffer memory 35. In this manner, the selector 36 outputs information consisting of 48 octets to the selector 30.

Referring to FIG. 6, voice packets [1] and [3] respectively transferred over the input lines #1 and #2 are temporarily stored in the buffer memories 25 of the short cell assembly parts $21_1$ and $21_2$. Then, the voice packets [1] and [3] are read from the buffer memories 25 so that the short cells [2] and [4] are generated, as has been described with reference to FIG. 5. The header and trailer generated by the header generator 34 are added to user information transferred over the input line #3 as shown in part (6) of FIG. 7, and the resultant data is divided every 48 octets via the selector 30.

The controller 31 of the multiplexing part 28 outputs the selection signal [8] to the selector 30, so that the ATM cell header generator 29, the short cell assembly parts $21_1$ and $21_2$ and the AAL processing part $32_1$ are selected as shown in FIG. 7. In the example shown in FIG. 7, the short cells are multiplexed in the payload fields of first two consecutive ATM cells. The 48-byte information processed by the AAL processing part $32_1$ is inserted into the payload field of the third ATM cell. Short cells are multiplexed in the payload field of the fourth ATM cell. The remaining user information from the AAL processing part $32_1$ is inserted into the payload field of the fifth ATM cell. The controller 31 monitors the states of the buffer memories 25 and 35 in the short cell assembly parts $21_1$ and $21_2$ and the AAL processing part $32_1$ via the controllers 27 and 37.

If there is no short cell or AAL-format packet (or there is user information or data exceeding 48 octets), dummy data or information of all zeros is output via the selector 30.

In the above manner, data assembled in the short cell format and supplied from the short cell assembly parts $21_1$ and $21_2$ or data assembled in the AAL format is sent during the payload section (48 octets) of the ATM cell. The ATM cell header is sent during the ATM cell header section. As a result of the above, the multiplexing of the short cells and the multiplexing of the standard ATM cells can be simultaneously carried out.

The structure shown in FIG. 6 is not limited to two short cell assembly parts but has an arbitrary number of short cell assembly parts. Similarly, the structure shown in FIG. 6 is not limited to one AAL processing part but has an arbitrary number of AAL processing parts. The operation of the controller 31 which should be carried out in such cases will be apparent from the above description.

Figure 8:
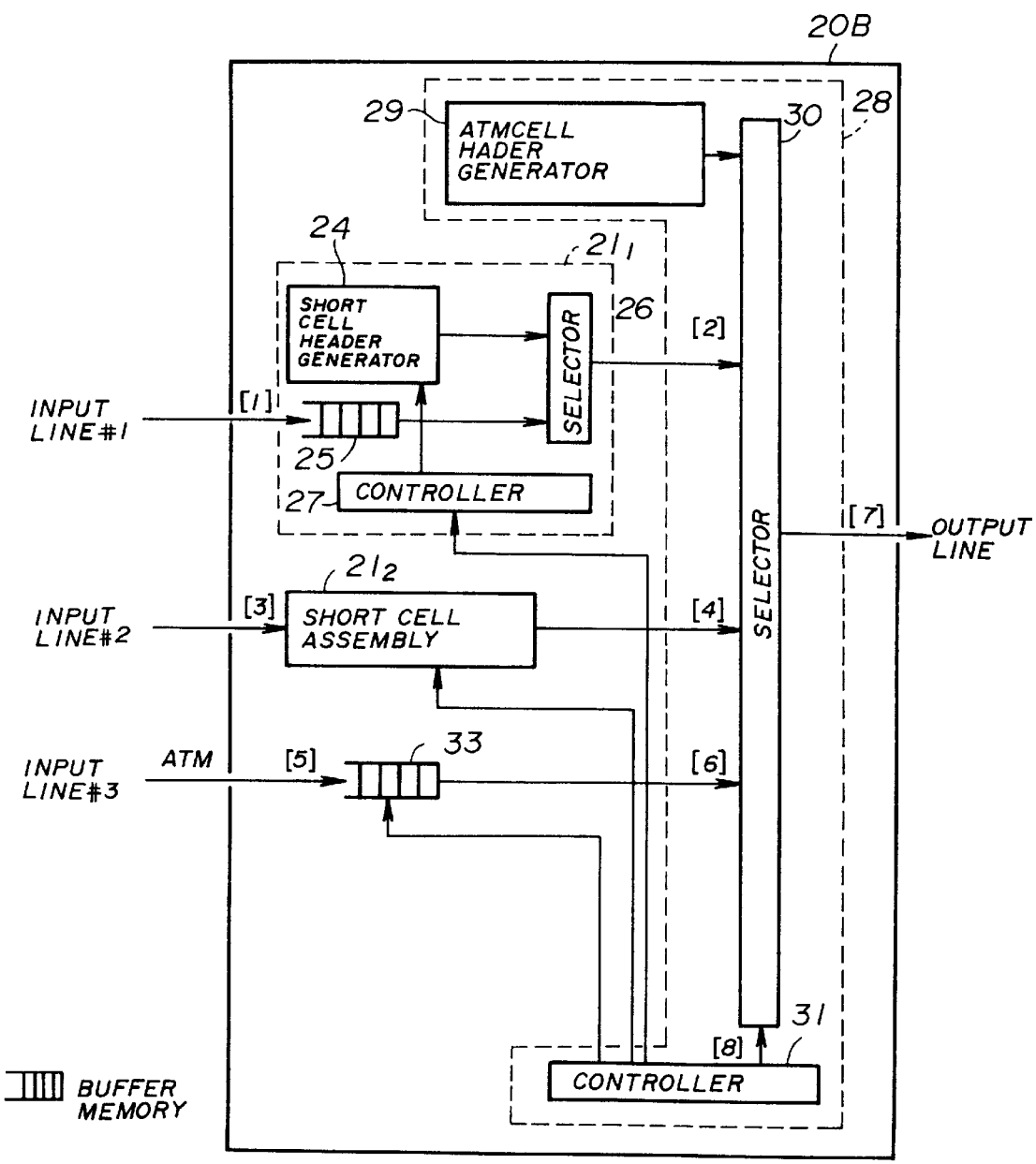
FIG. 8 is a block diagram of a short cell assembly and multiplexing device according to a third embodiment of the present invention.

A description will now be given, with reference to FIGS. 8 and 9, of a cell assembly and multiplexing device according to a third embodiment of the present invention. In FIG. 8, parts that are the same as those shown in the previously described figures are given the same reference numbers. A cell assembly and multiplexing device 20B shown in FIG. 8 is directed to assembling of short cells and multiplexing of short cells and ATM cells by means of a single stage of buffer memories. In FIG. 8, a buffer memory 33 is provided instead of the short cell assembly part $21_3$. The buffer memory 33 temporarily stores ATM cells transferred over the input line #3.

Figure 9:
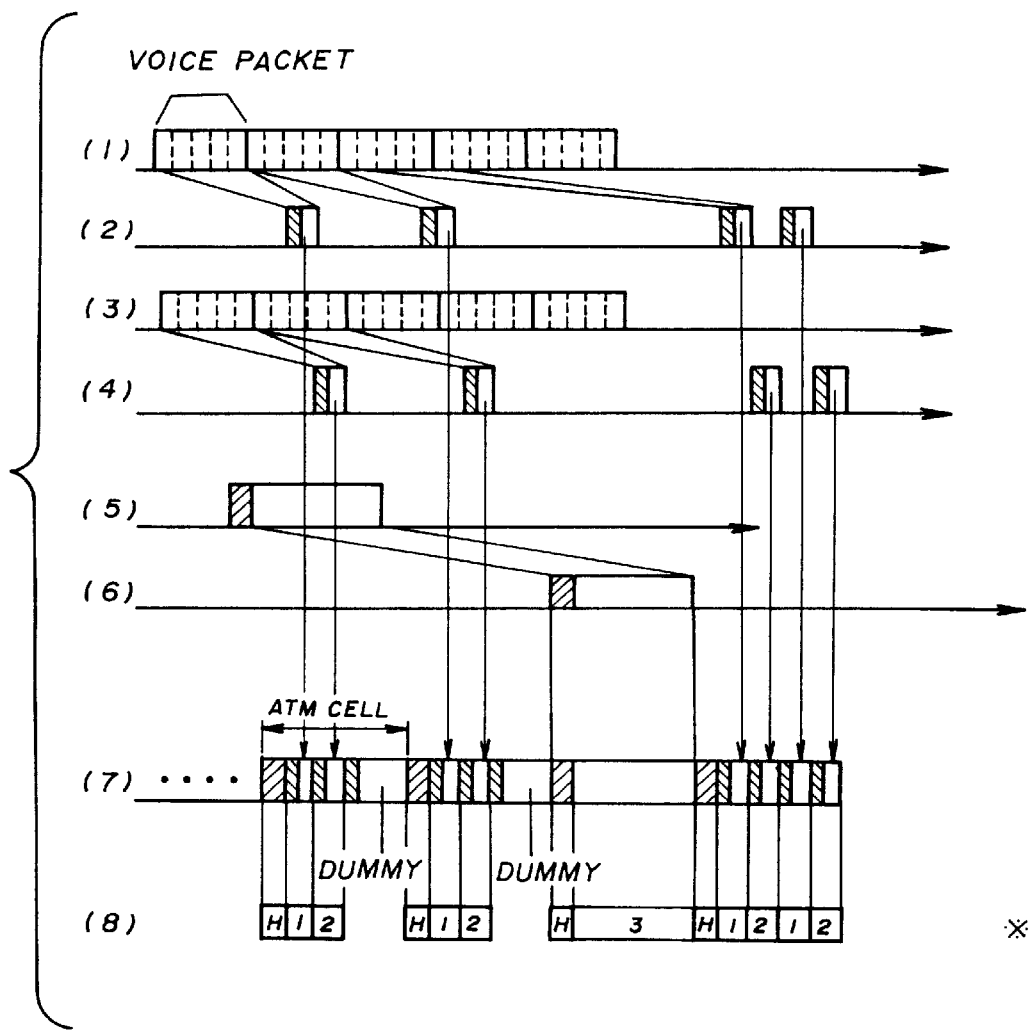
FIG. 9 is a timing chart of an operation of the device shown in FIG. 8.

The controller 31 of the multiplexing part 28 shown in FIG. 8 sends the selection signal [8] to the selector 30, which selects the ATM cell header generator 29, the short cell assembly parts $21_1$ and $21_2$ and the buffer memory 33, as shown in FIG. 9. The above selecting operation is carried out based on a predetermined sequence or by monitoring the states of the buffer memories 25 and 33. In the example shown in FIG. 9, the short cells are multiplexed in the payload fields of the first and second ATM cells, and the ATM cell from the buffer memory 33 corresponds to the third ATM cell.

In the above manner, data assembled in the short cell format and supplied from the short cell assembly parts $21_1$ and $21_2$ or data in the payload field of the ATM cell is sent during the payload section (48 octets) of the ATM cell. The ATM cell header is sent during the ATM cell header section. As a result of the above, the multiplexing of the short cells and the multiplexing of the standard ATM cells can be simultaneously carried out.

The structure shown in FIG. 8 is not limited to two short cell assembly parts but has an arbitrary number of short cell assembly parts. Similarly, the structure shown in FIG. 8 is not limited to one buffer memory 33 but has an arbitrary number of buffer memories. The operation of the controller 31 which should be carried out in such cases will be apparent from the above description.

Figure 10:
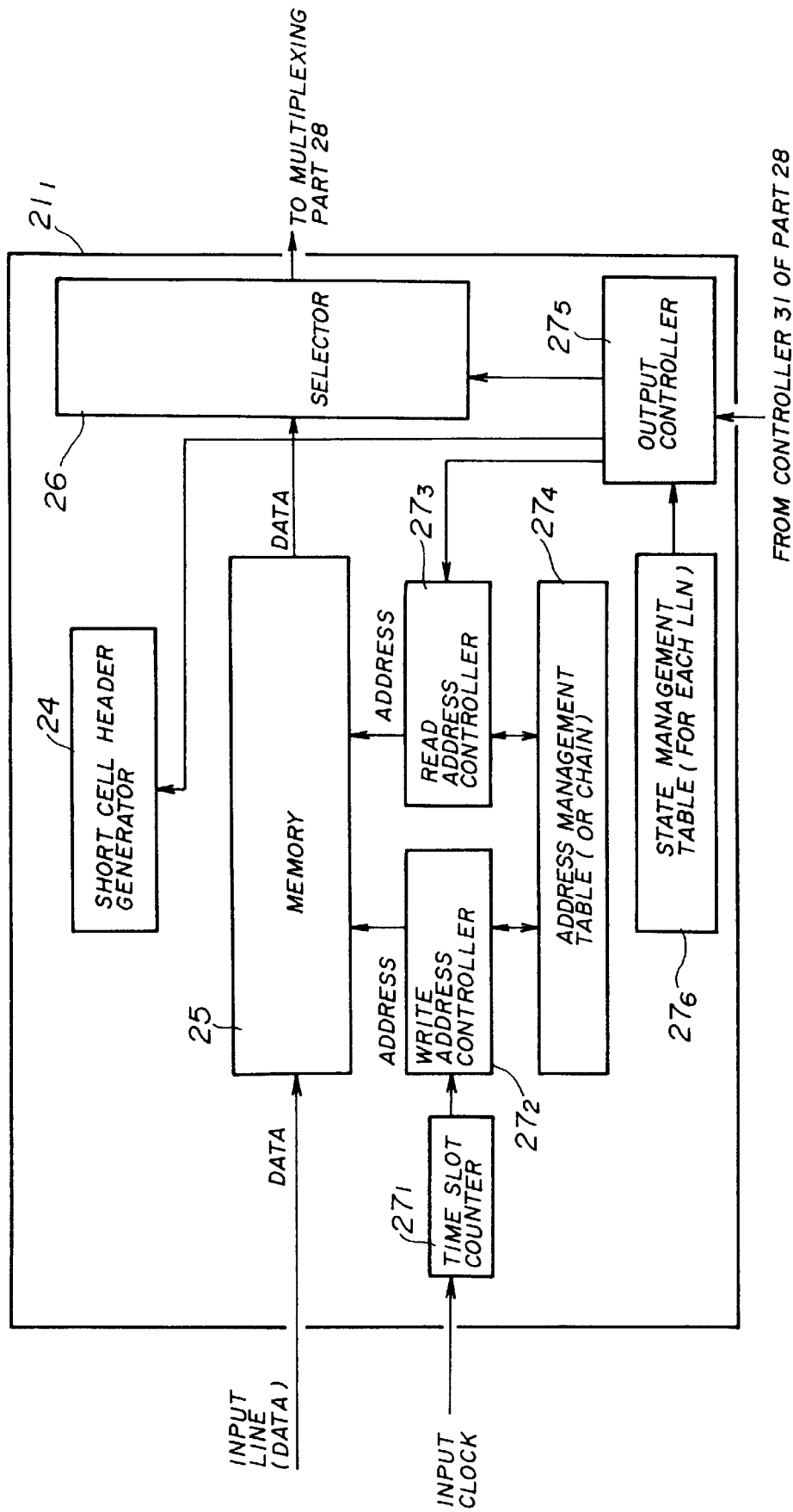
FIG. 10 is a block diagram of a short cell assembly part used in the embodiments of the present invention.

FIG. 10 is a block diagram of the short cell assembly part $21_1$. The aforementioned AAL processing part $32_1$ has the same structure as shown in FIG. 10. The buffer memory 25 can be formed of, for example, a two-port memory. The controller 27 of the short cell assembly part $21_1$ is made up of a time slot counter $21_1$, a write address controller $27_2$, a read address controller $27_3$, an address management table $27_4$, an output controller $27_5$ and a state management table $27_6$ in which each short cell connection is managed.

Figure 11:
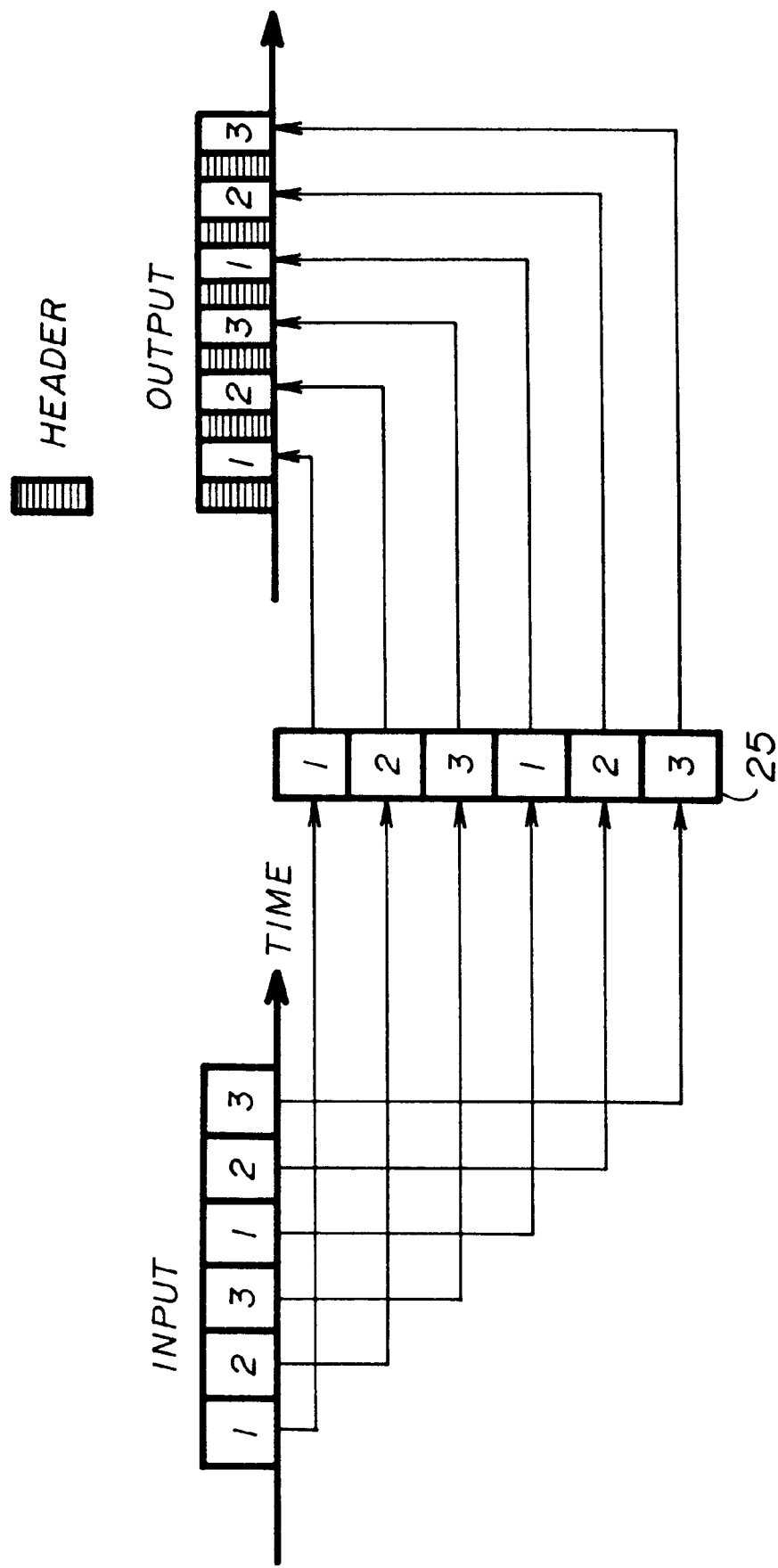
FIG. 11 is a timing chart of an operation of the device shown in FIG. 10.

The structure shown in FIG. 10 is capable of assembling, in the time division multiplexing formation, cells for each of channels which are multiplexed in the time division multiplexing formation. The input information concerning the respective channels is multiplexed in the time division multiplexing formation. Hence, each of the time slots has a fixed period. It is thus possible to separate the channels from each other on the basis of the count value of the time slot counter $27_1$ which counts an input clock applied thereto. The write address controller $27_2$ generates a write address by using the count value of the time slot counter $21_1$, and applies the write address to the memory 25. Hence, data can be separately stored in the memory 25 for each channel. For example, as shown in FIG. 11, pieces 1, 2, 3, 1, 2, 3 of input information are separately stored in the buffer memory 25. Hence, the write address controller $27_2$ refers the address management table $27_4$ and generates the write address based on the correspondence between the channels and the address space of the buffer memory 25. Alternatively, the write address controller $27_2$ utilizes a predetermined address chain, and dynamically allots the memory space for each channel.

The read operation is carried out as follows. When the output controller $27_5$ receives an enable signal from the controller 31 of the multiplexing part 28, the output controller $27_5$ refers to the state of each LLN stored in the state management table $27_6$. Then, the output controller $27_5$ makes a decision as to via which logical channel data is being output, whether logical channel is available for outputting data, whether the short cell header generator 24 is outputting the short cell header or data to be placed in the payload field is being sent. The logical channel can be identified by the LLN in the short cell header. Based on the decision result, the output controller $27_5$ controls the parts (any of the short cell header generator 24, the selector 26 and the read address controller $27_3$) necessary for the process to be performed based on the decision result, so that an appropriate output signal can be obtained.

Figure 12:
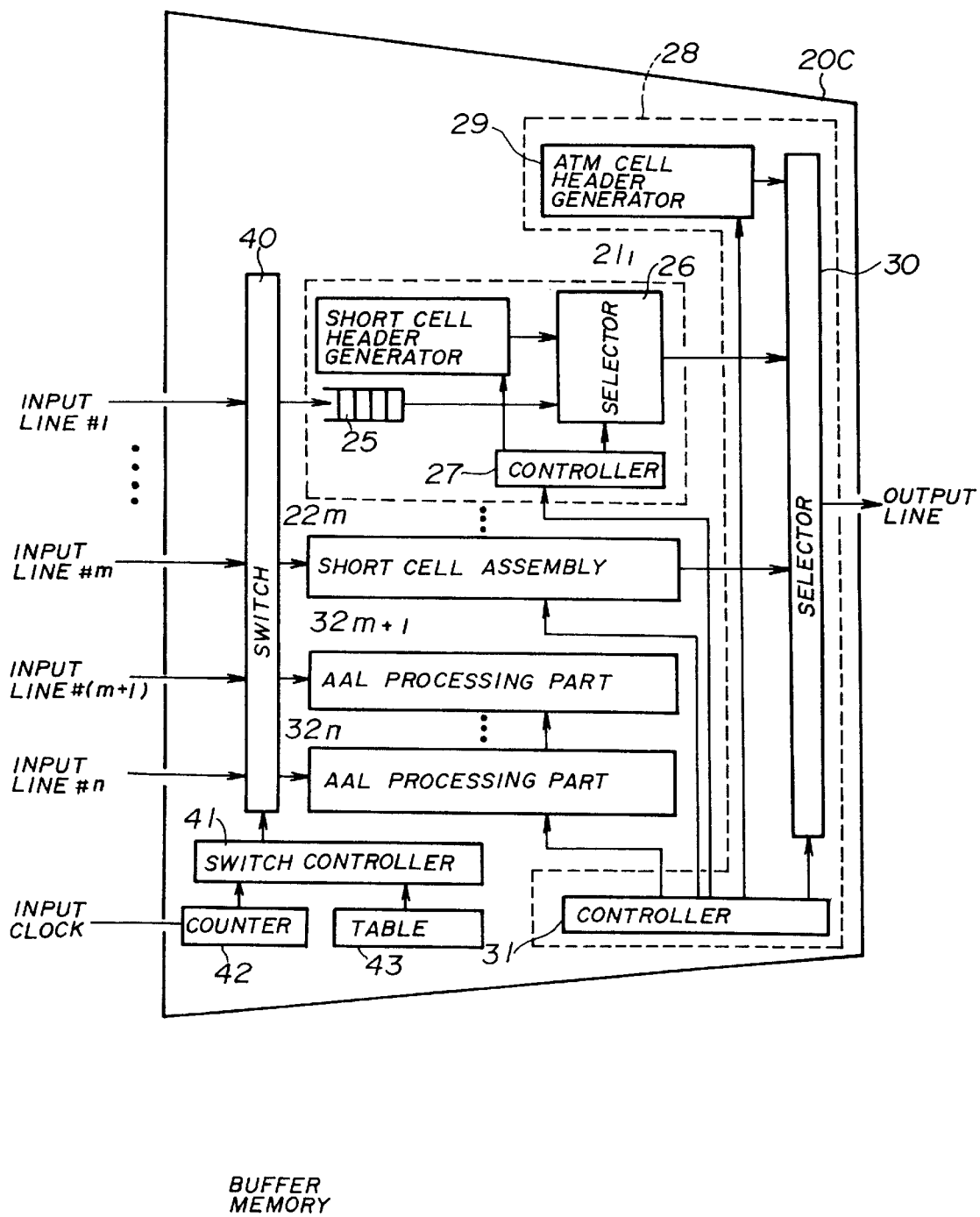
FIG. 12 is a block diagram of a short cell assembly and multiplexing device according to a fourth embodiment of the present invention.

FIG. 12 is a block diagram of a cell assembly and multiplexing device 20C according to a fourth embodiment of the present invention. In FIG. 12, parts that are the same as those shown in the previously described figures are given the same reference numbers. The fourth embodiment of the present invention is directed to providing a switch 40 which is located at the input stage of the cell assembly and multiplexing device 20C and operates on the time slot basis. The switch 40 is provided between input lines #1–#m, #(m+1), #n and a group of the short cell assembly parts $21_1$–$21_m$ and the AAL processing parts $32_{m+1}$ and $32_n$.

In order to control the switch 40, provided are a switch controller 41, a counter 42 and a table 43. The counter 42 counts the input clock to detect the time slot position. The table 43 stores the input/output relationship between the time slots in the input signals and output destinations. The switch controller 41 controls the switch 40 so that the time slots on the input lines #1–#m, #(m+1) and #n are switched in accordance with the input/output relation defined in the table 43. For example, if the input/output relationship is defined in the table 43 so that a time slot TS1 (channel) on the input line #1 should be switched to the short cell assembly part $22_m$, the switch controller 41 controls the switch 40 to output the time slot TS1 to the short cell assembly part $22_m$ when the count value of the counter 42 indicates the timing corresponding to the time slot TS1.

The relationships between the time slots and the output identifications with respect to the input lines #1–#m or may be different from each other. With the above structure, it is possible to assemble the cells in the different ways for each channel on the input lines by connecting the input lines to the desired cell assembly parts (the short cell assembly parts and AAL processing parts) for each time slot.

Figure 13:
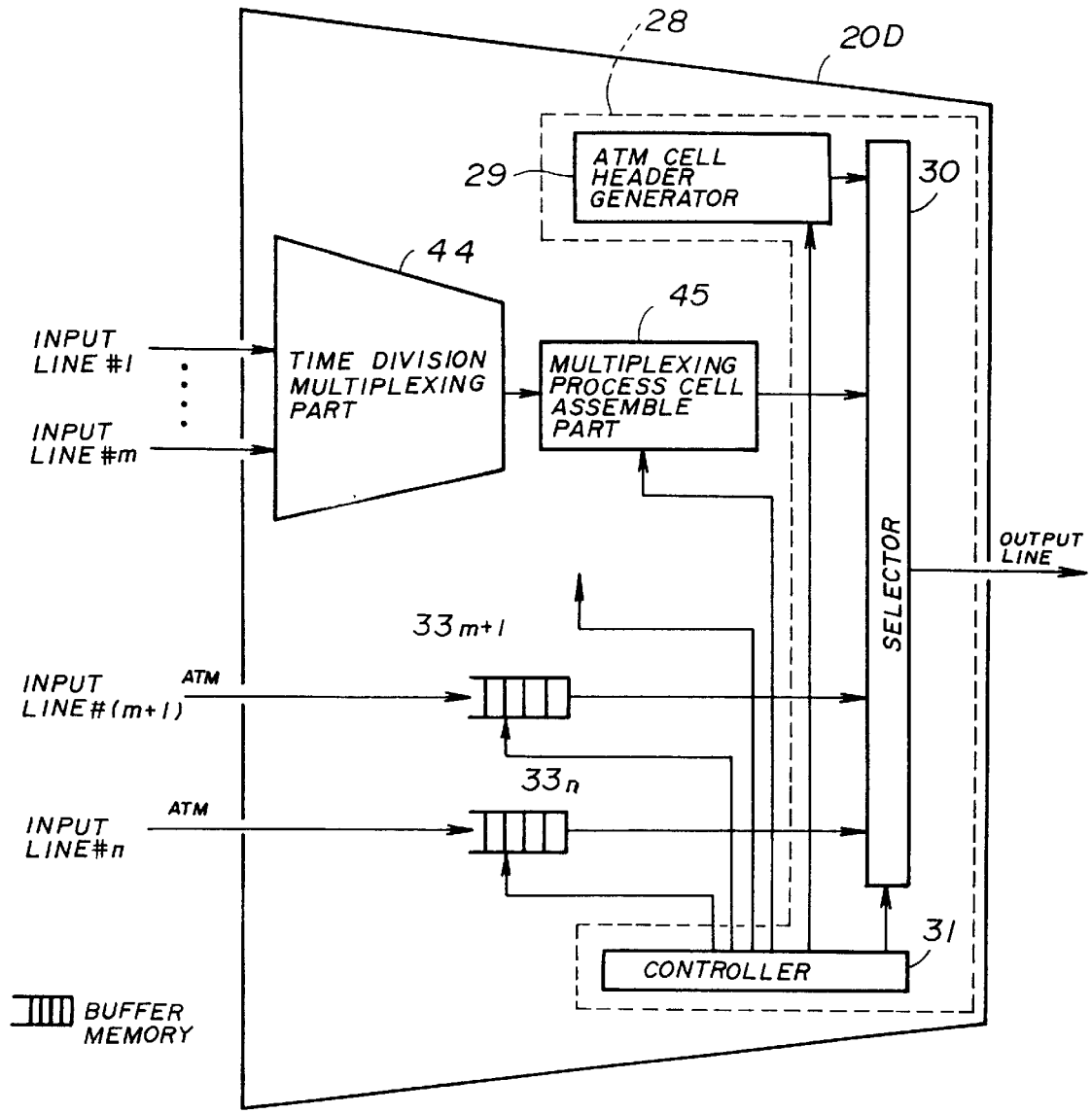
FIG. 13 is a block diagram of a short cell assembly and multiplexing device according to a fifth embodiment of the present invention.

FIG. 13 is a block diagram of a cell assembly and multiplexing device 20D according to a fifth embodiment of the present invention. In FIG. 13, parts that are the same as those shown in the previously described figures are given the same reference numbers. The cell assembly and multiplexing device 20D is obtained by adding a time division multiplexing part 44 and a multiplexing process cell assembly part 45 to the input stage of the cell assembly and multiplexing device 20C. The parts 44 and 45 operate on the time slot basis. The time division multiplexing part 44 performs a time division multiplexing operation on the time slots on the input lines #1–#m. The multiplexing process cell assembly part 45 has the same structure as shown in FIG. 10, and assembles data processed in the time division multiplexing formation into short cells. The multiplexing process cell assembly part 45 operates at a speed higher than that of the short cell processing part $21_1$ because the part 45 processes data processed in the time division multiplexing formation. The multiplexing process cell assembly part 45 is capable of assembling standard AAL format cells. This is because the basic operation in which the header (or trailer) is added to user information is common to the standard ATM cells and the short cells.

The multiplexing part 28 multiplexes data from the multiplexing process cell assembly part 45 and data from the buffer memories $33_{m+1}$ and $33_n$.

According to the fifth embodiment of the present invention, it is possible to assemble the short cells and standard AAL format cells in the multiplexed formation.

Figure 14:
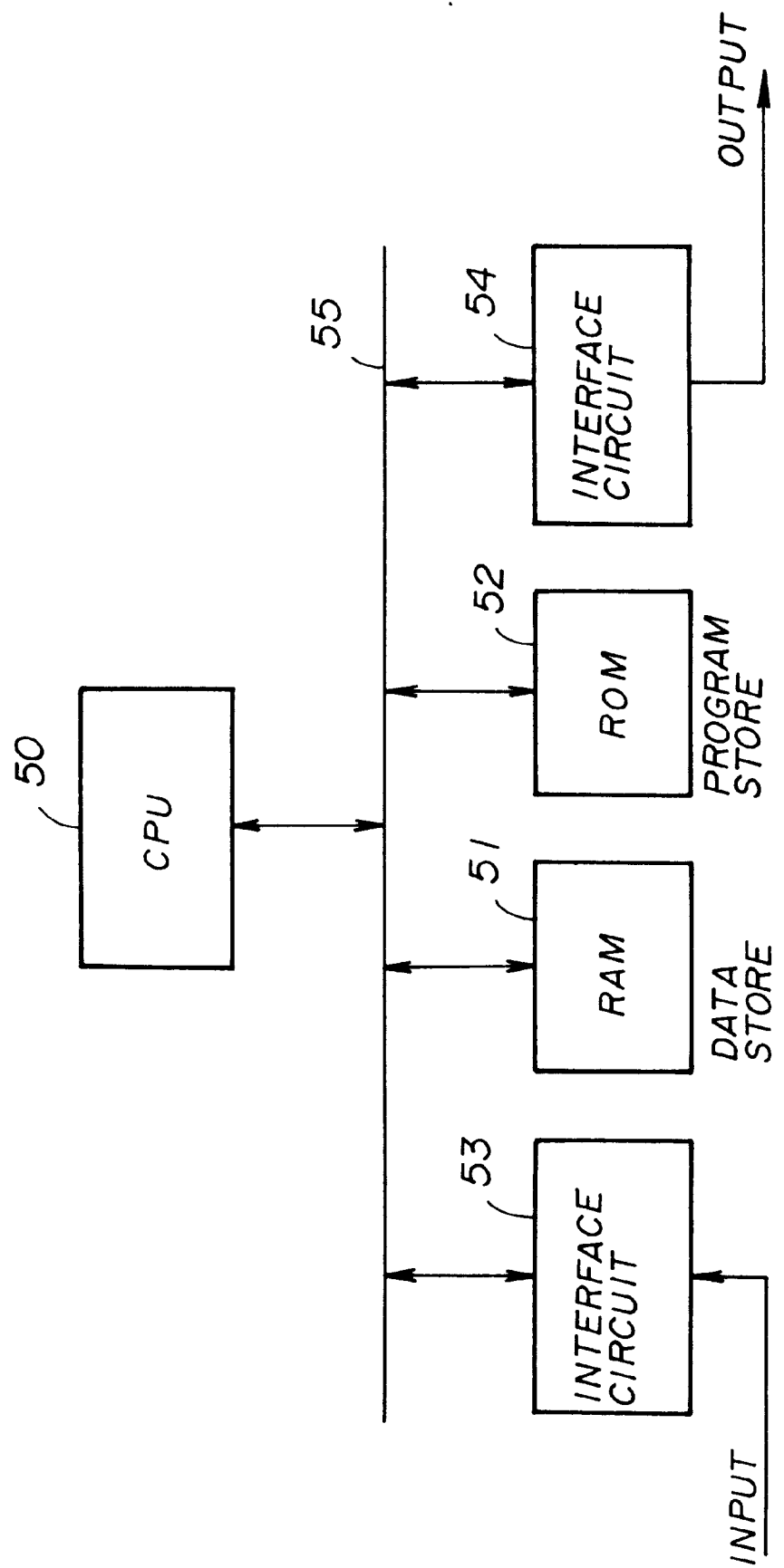
FIG. 14 is a block diagram of a hardware structure which realizes the short cell assembly and multiplexing devices according to the first to fifth embodiments of the present invention.

The controllers 27 and 31 used in the first through fourth embodiments of the present invention are separately or integrally formed by a computer system shown in FIG. 14. The computer system shown in FIG. 14 is made up of a CPU 50, a RAM 51, a ROM 52, an input interface circuit 53, an output interface circuit 54 and a bus 55. The CPU 50 executes the above-mentioned control processes in accordance with a program stored in the ROM 52. The RAM 51 is a work area of the CPU 50, and stores the above-mentioned tables. If the ROM 52 is a programmable ROM, it will be easily possible to modify the program of assembling multiplexing cells. It is also possible to form a part or all of the computer system shown in FIG. 14 in an LSI formation.

The control of the selectors 26 and 30 used in the first to fourth embodiments of the present invention can be carried out in a predetermined priority-based order. For example, in order to assign the short cells priority over the standard ATM cells and the standard AAL-format cells, the information stored in the buffer memories of the short cell assembly parts is output with priority over outputting of information for the standard ATM cells and the standard AAL-format cells. Another priority can be defined so that the output times at which data for assembling the short cells and data for assembling the standard cells are output at respective fixed times.

A description will now be given of embodiments of the present invention directed to extracting short cells from the ATM cells.

Figure 15:
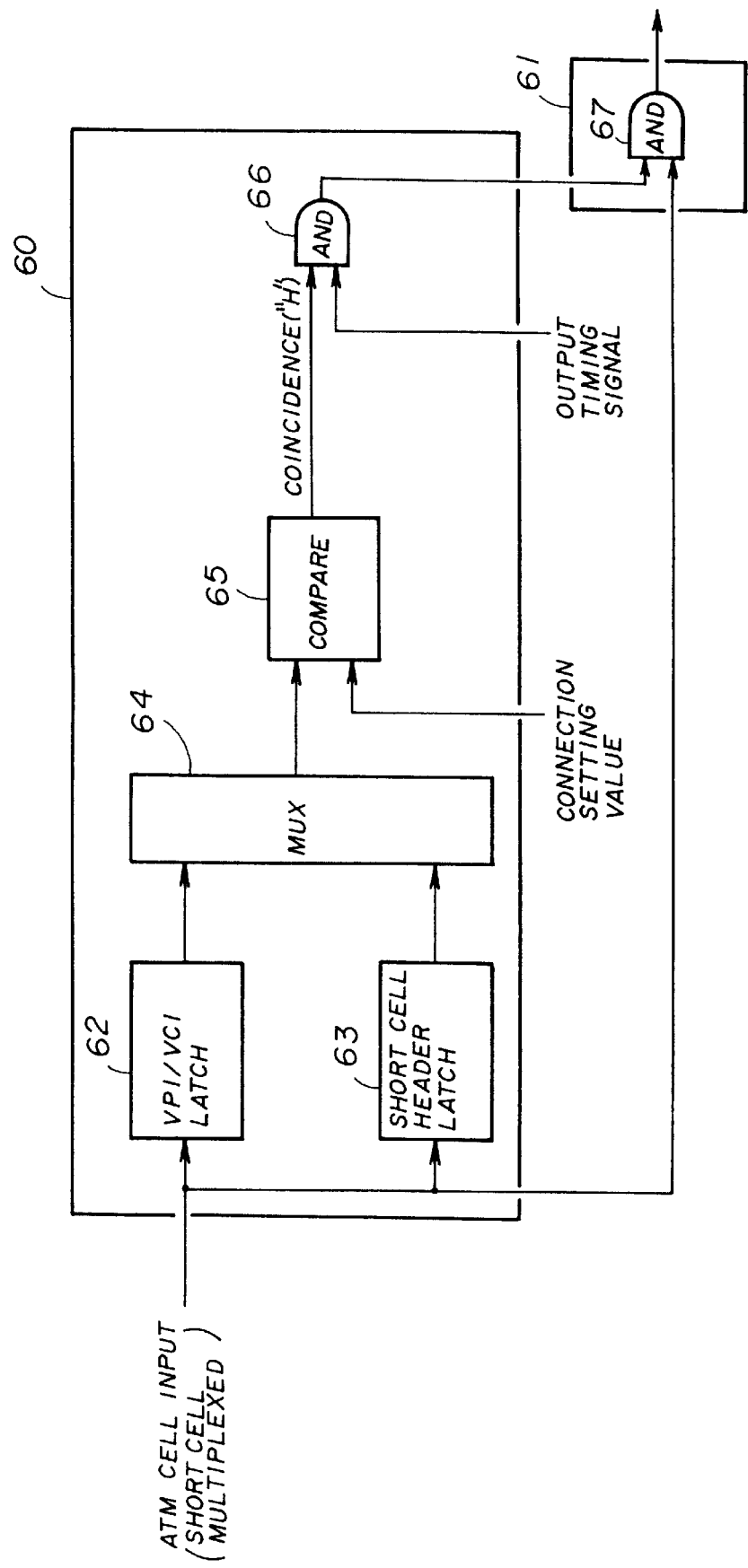
FIG. 15 is a block diagram of a short cell demultiplexing device according to a sixth embodiment of the present invention.

FIG. 15 is a block diagram of a short cell demultiplexing device according to a sixth embodiment of the present invention. The short cell demultiplexing device includes a cell discrimination part 60 and a short cell extracting part 61. The cell discrimination part 60 receives, via a transmission path, the ATM cells in which the short cells are multiplexed according to the aforementioned first through fifth embodiments of the present invention. Then, the cell discrimination part 60 discriminates the short cells from the ATM cells. When a short cell is detected, the cell discrimination part 60 outputs an enable signal to the short cell extracting part 61. In response to the enable signal, the short cell extracting part 61 allows the received ATM cell to pass therethrough. Since the enable signal is generated only each time the short cell is detected, only short cells are output via the short cell extracting part 61. In other words, the cells other than the short cells are not allowed to pass through the short cell extracting part 61.

The cell discrimination part 60 includes a VPI/VCI latch part 62, a short cell header latch part 63, a multiplexer (MUX) 64, a comparator 65 and an AND gate 66. The VPI/VCI latch part 62 detects the VPI/VCI of the ATM cell, and latches it. The short cell header latch part 63 detects the short cell header and latches it. The headers latched are sequentially output to the comparator 65 via the multiplexer 64. The comparator 65 compares the headers with the given connection identifier (VPI, VCI and the short cell connection identifier), and outputs a coincidence signal (which is at a high level) to the AND gate 66 only when the header coincides with the given connection identifier. The AND gate 66 outputs the enable signal while the output timing signal generated based on the timing of the ATM cell is at the high level, in other words, while the short cell is being received.

The short cell extracting part 61 is equipped with an AND gate 67, and continues to output the short cell as long as the enable signal is received. When the enable signal is not received, the output signal of the AND gate 67 is at the low level.

With the above structure, it is possible to obtain only the short cells to be extracted (separated).

Figure 16:
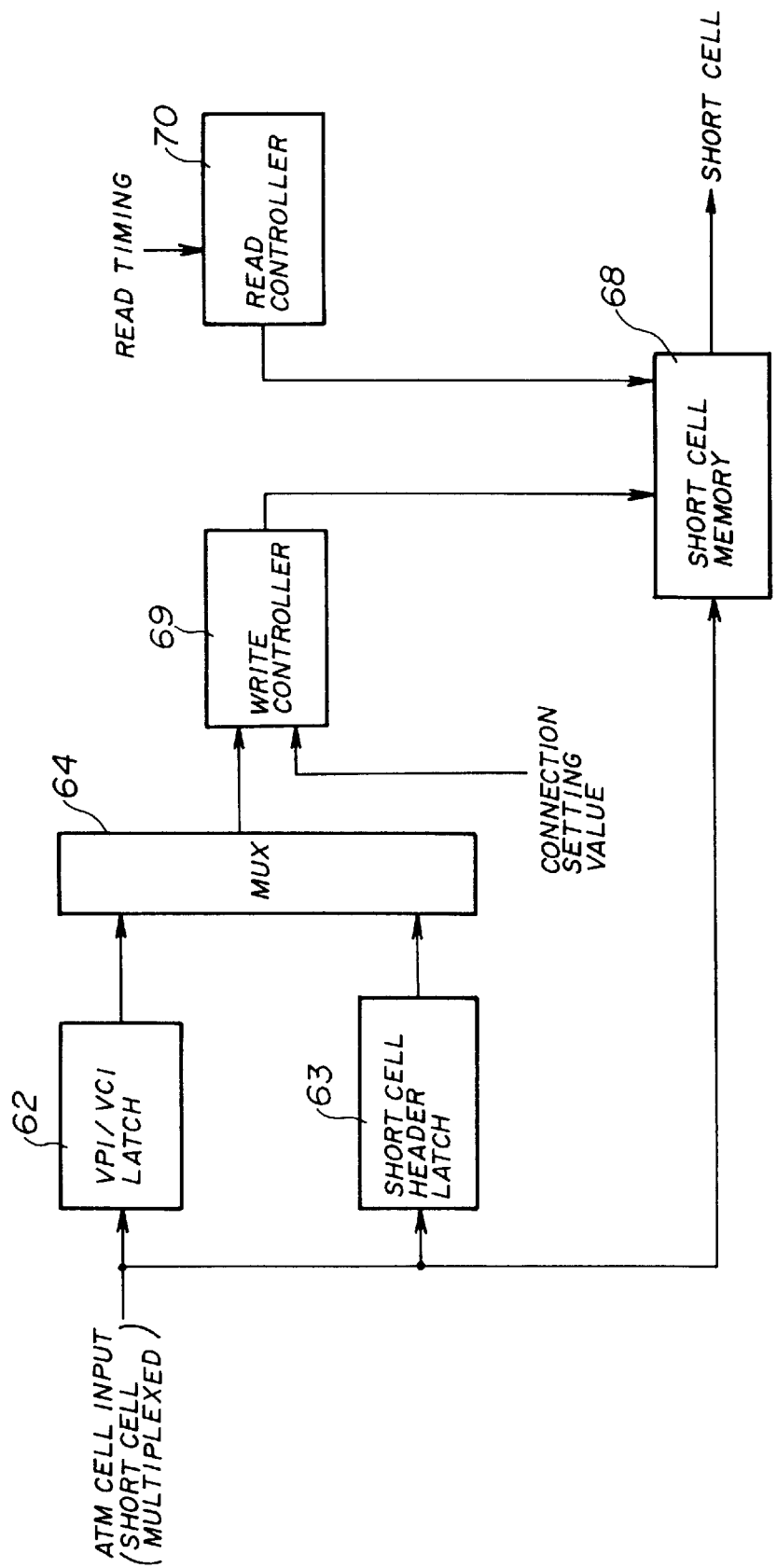
FIG. 16 is a block diagram of a shirt cell demultiplexing device according to a seventh embodiment of the present invention.

FIG. 16 is a block diagram of a short cell demultiplexing device according to a seventh embodiment of the present invention. In FIG. 16, parts that are the same as those shown in FIG. 15 are given the same reference numbers. The structure shown in FIG. 16 is directed to providing a short cell storing memory 68, which functions as the short cell extracting part 61 and temporarily stores the short cells. A write controller 69 compares the header from the multiplexer 64 with the given connection identifier, and generates a write enable signal based on the comparing result. Since the short cell header includes the short cell length LI, data equal to the short cell length LI is stored in the short cell memory 68. The short cell written into the short cell memory 68 is read therefrom in accordance with a write enable signal supplied from the read controller 70 which receives a read timing.

The short cells are temporarily stored in the short cell memory 68, so that a sequence of outputting the short cells can be defined by controlling the read timing. Hence, it is possible to absorb a jitter of the received ATM cells.

Figure 17:
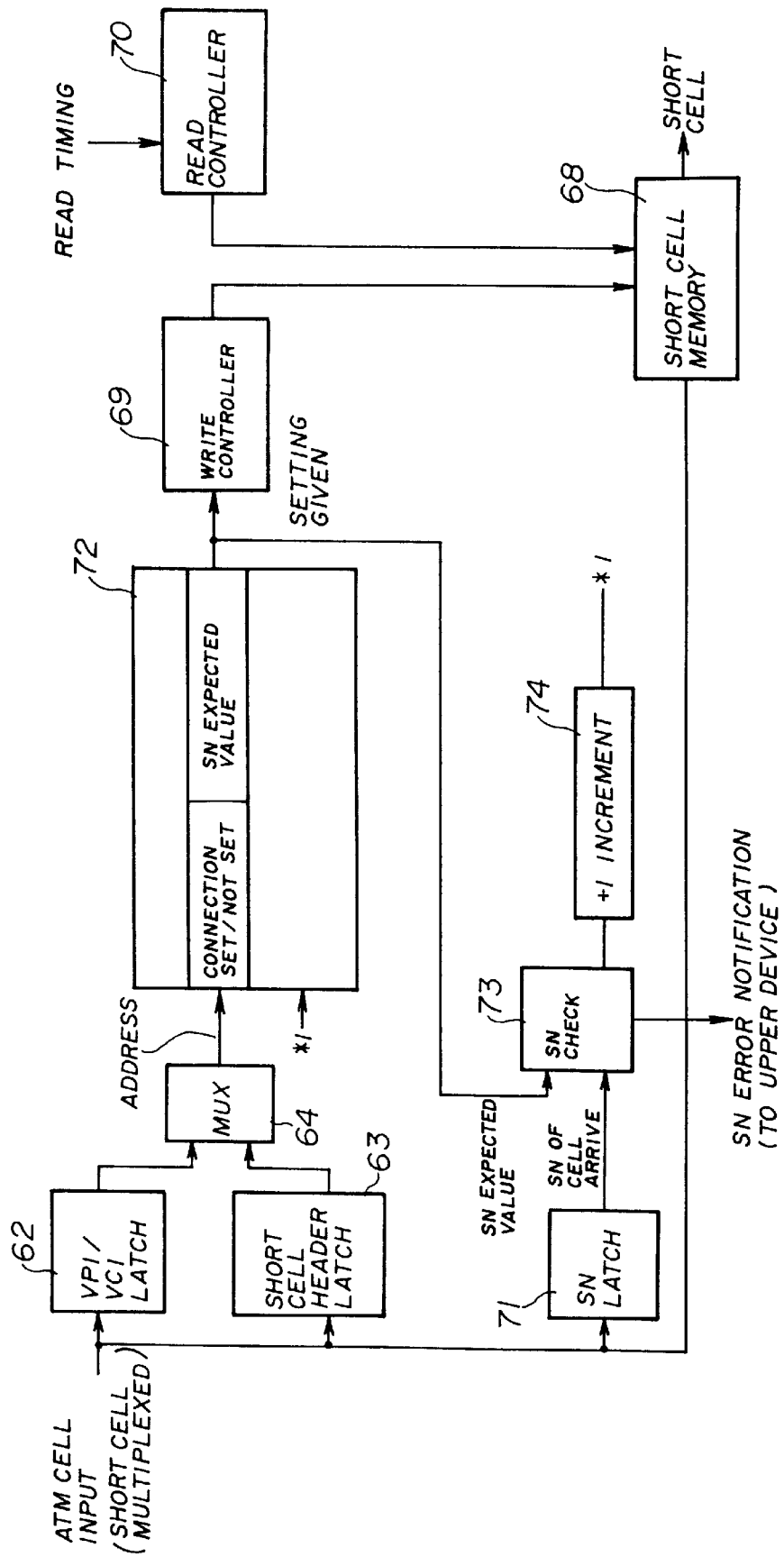
FIG. 17 is a block diagram of a short cell demultiplexing device according to an eighth embodiment of the present invention.

FIG. 17 is a block diagram of a short cell demultiplexing device according to an eighth embodiment of the present invention. In FIG. 17, parts that are the same as those shown in the previously described figures are given the same reference numerals. The structure shown in FIG. 17 is directed to setting a plurality of values of the connection identifier and extracting short cells relating to a plurality of calls.

A connection setting memory 72 stores setting information concerning calls (information indicating whether a connection is set or not set, information concerning an expected value of the sequence number (SN), and so on). The connection setting memory 72 can be accessed by an address which has a value obtained by combining the VPI, VCI and the short cell header supplied from the multiplexer 64. If the connection information accessed by the address is set in the connection setting memory 72, it is determined that the corresponding short cell should be extracted. If no connection information is set, the cell is not extracted or is discarded. The connection information is applied to the write controller 69, if the connection information is set in the connection setting memory 72. The write controller 69 enables the short cell storing memory 68 to store the short cell.

The expected value of the sequence number SN is output to a sequence number (SN) check part 73. The SN latch part 71 latches the sequence number included in the user information provided in the payload field of the ATM cell, and outputs the latched sequence number to the SN check part 73. The SN check part 73 compares the latched sequence number with the expected value of the SN. If the latched sequence number is equal to the expected value, the SN check part 73 performs nothing so that the short cell is stored in the short cell memory 68. If the latched sequence number is not equal to the expected value, it is concluded that the ATM cells do not have a continuity and a cell is thus lost. Then, the SN check part 73 outputs an SN error notification to an upper device.

An adder 74 increments the sequence number SN by +1, and supplies the connection setting memory 72 with the incremented sequence number SN. The incremented sequence number SN serves as the expected value for the short cell which is next received. That is, the expected value of the sequence number SN is the value obtained by incrementing the sequence number SN of the short cell which is just previously received by +1. It will be noted that the expected value of the sequence number SN cannot be determined with respect to the short cell immediately after the connection is set. Hence, the short cell received immediately after the connection is set is not subjected to the SN check by the SN check part 73. It is possible to determine whether the short cell received is received immediately after the connection is set by providing a flag in the connection setting memory 72 or setting an unusual value to the sequence number SN.

As described above, it is possible to extract the short cells by a single device by using the connection setting memory 72 in which connection information concerning a plurality of calls is stored.

Figure 18:
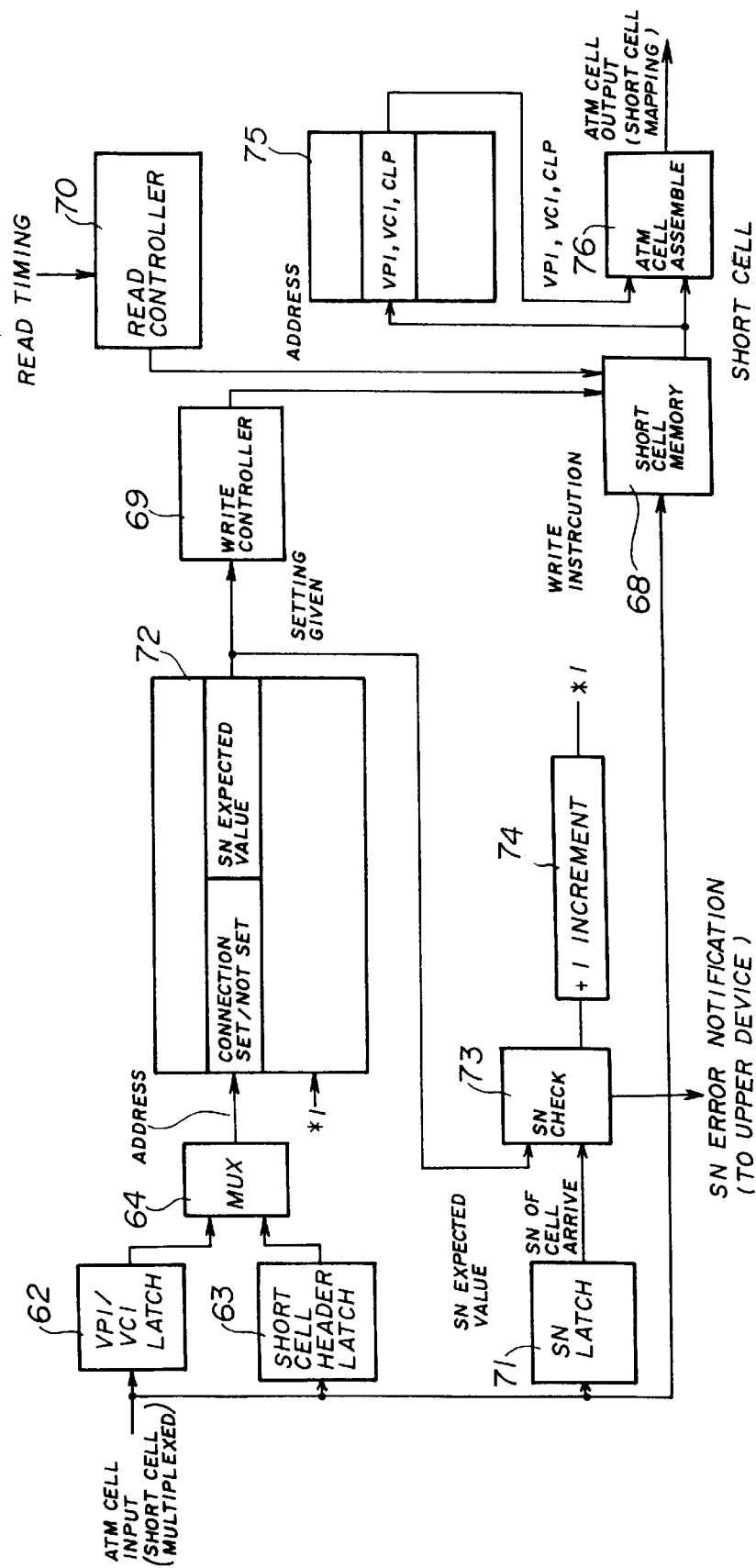
FIG. 18 is a block diagram of a short cell demultiplexing device according to a ninth embodiment of the present invention.

FIG. 18 is a block diagram of a short cell demultiplexing device according to a ninth embodiment of the present invention. In FIG. 18, parts that are the same as those shown in the previously described figures are given the same reference numbers. The structure shown in FIG. 18 is directed to adding an ATM cell setting memory 75 and an ATM cell assembly part 76 to the structure shown in FIG. 17. The sequence from the cell arrival to the writing of the short cells into the short cell memory 68 is the same as that of the structure shown in FIG. 17. By using the connection identifier included in the header of the short cell read, the header information (VPI, VCI, CLP, SN and so on) of the ATM cell is read from the ATM cell setting memory 75. The ATM assembly part 76 inserts (maps) the short cell in the payload field of the ATM cell.

With the structure shown in FIG. 18, one short cell can be mapped in the payload field of the ATM cell, so that the short cells can be transferred via the existing ATM switch.

Figure 19:
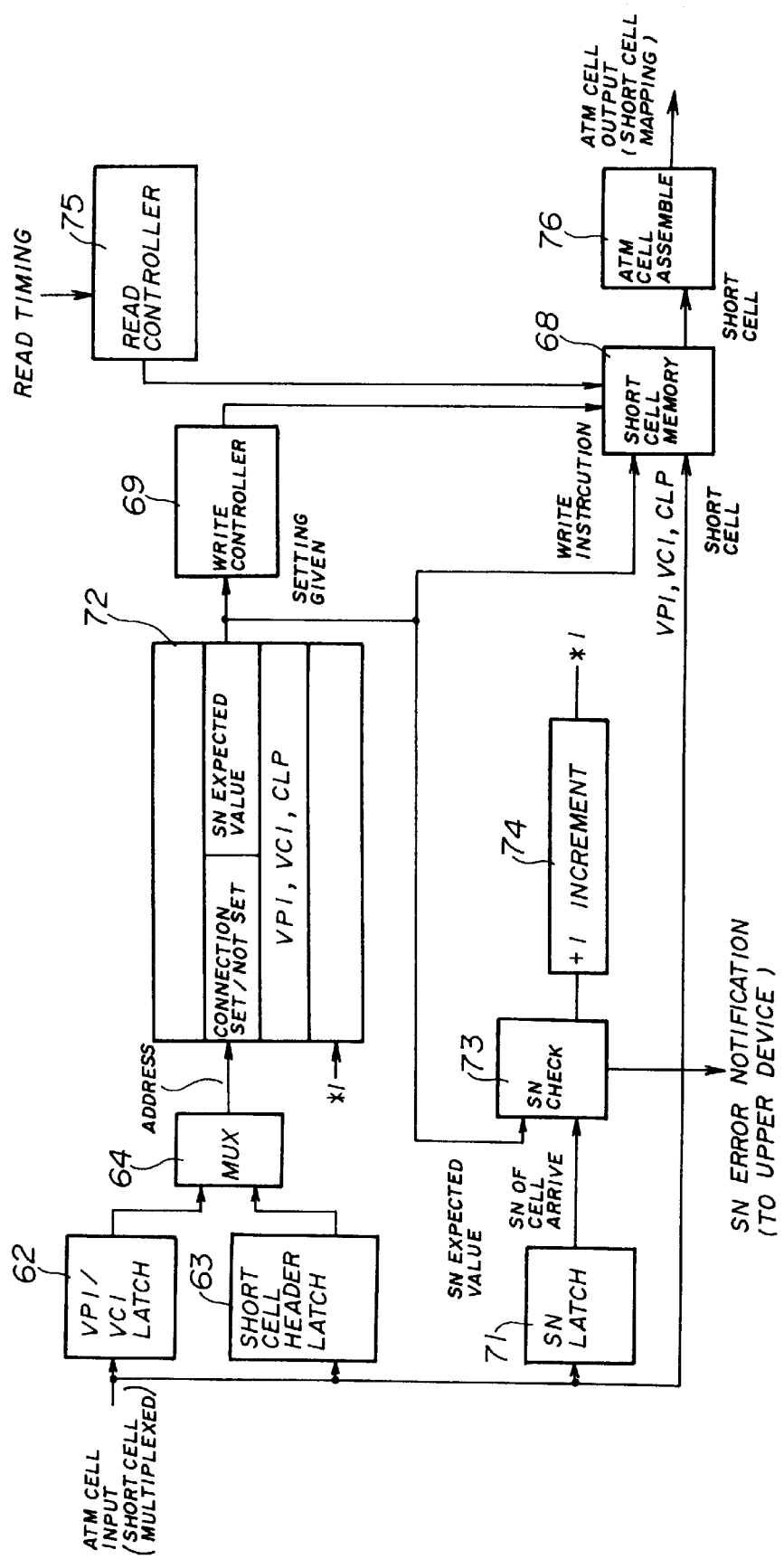
FIG. 19 is a block diagram of a short cell demultiplexing device according to a tenth embodiment of the present invention.

FIG. 19 is a block diagram of a short cell demultiplexing device according to a tenth embodiment of the present invention. In FIG. 19, parts that are the same as those shown in the previously described figures are given the same reference numbers. The structure shown in FIG. 19 is directed to storing the header information (VPI, VCI, CLP, SN and so on) of the ATM cell in the connection setting memory 72 rather than the ATM cell setting memory 75 used in FIG. 18. In the connection setting memory 72, the header information necessary to assemble the ATM cell is stored in the same memory area (accessed by a single address value) as the call setting information (information indicating whether a connection is set or not set, information concerning an expected value of the sequence number (SN), and so on). Hence, the header information is stored together with the short cell when this short cell is stored. With the above structure, the header information necessary to assemble the ATM cell can be read at the same time as the short cell is read, so that the ATM cell can be efficiently assembled by using the header information with a reduced time and a reduced hardware structure.

Figure 20:
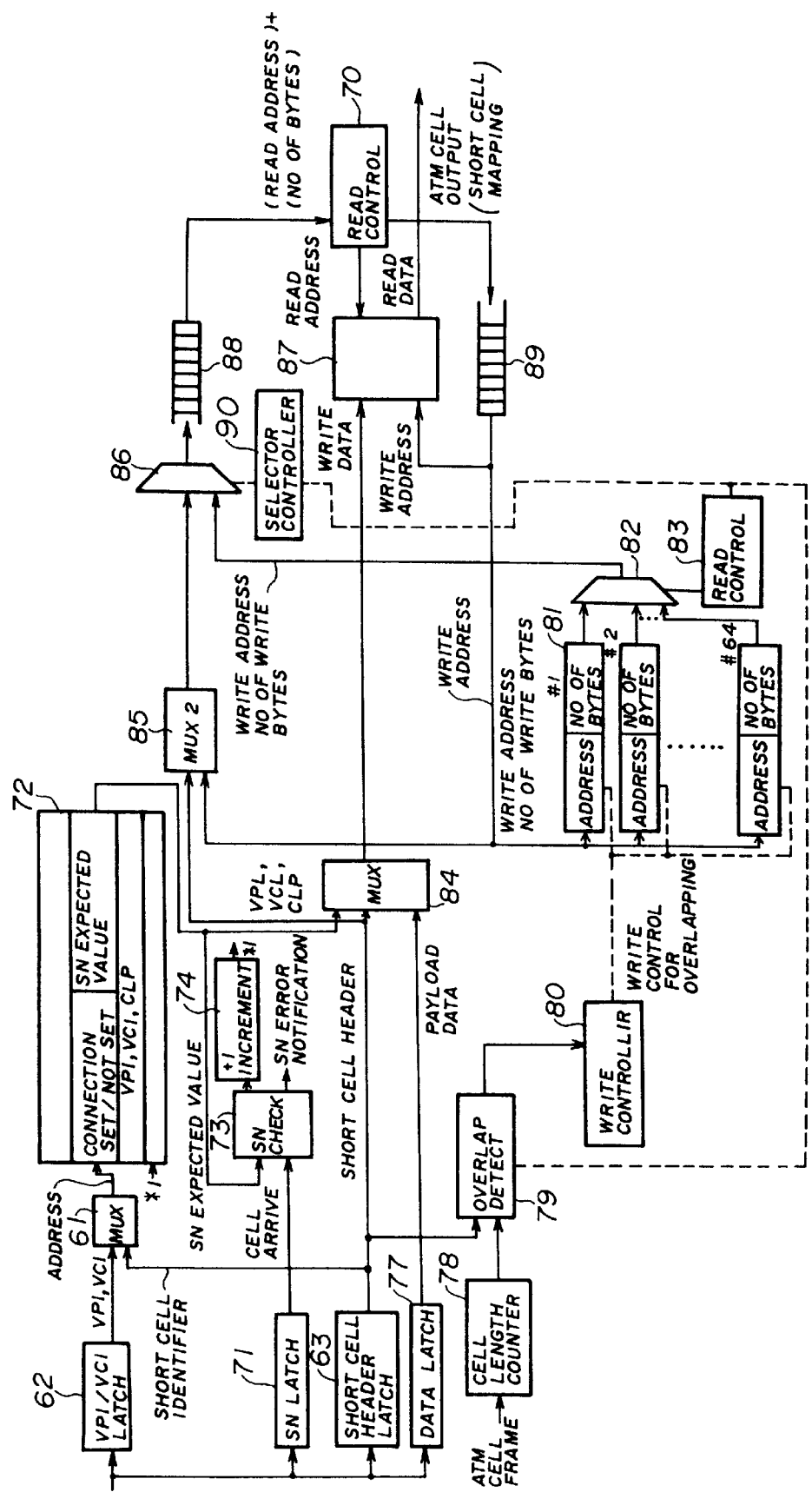
FIG. 20 is a block diagram of a short cell demultiplexing device according to an eleventh embodiment of the present invention.

FIG. 20 is a block diagram of a short cell demultiplexing device according to an eleventh embodiment of the present invention. In FIG. 20, parts that are the same as those shown in the previously described figures are given the same reference numbers. The structure shown in FIG. 20 has an arrangement in which low-bit-rate lines are multiplexed and a short cell can be extracted which is separately mapped (overlap) in two ATM cells which are not successively arranged but are separated via cells relating to a call different from the call relating to the above two ATM cells.

The structure shown in FIG. 20 is equipped with a data memory 87 from which data is read under the control of the controller 70. The read sequence is connected by an address management FIFO memory 88. The read address is output to a free address management FIFO memory 89, from which write address is read.

A cell length counter 78 counts a signal indicative of the ATM cell frame, and outputs a count value to an overlap detector 79, which receives the short cell length indication LI included in the short cell from the short cell header latch part 63. The overlap detector 79 determines, from the count value and the short cell length indication LI, whether the short cell is mapped so as to extend over two ATM cells. If the result of the above determination is affirmative, the overlap detector 79 activates an overlap management write controller 80. Hence, the write address which causes the short cell of the first one of the two ATM cells to be stored in the data memory 87 is temporarily stored, together with the number of bytes (read from the free address management FIFO memory 89), in the overlap management memory 81 (one of memories #1–#64). The short cell of the next arrival relating to the same call as the short cell stored in the data memory 87 is processed in the same manner as described above so that the write address thereof and the number of bytes thereof are stored in the overlap management memory 81. The correspondence between memories #1–#64 and the short cells stored in the data memory 87 is managed by an overlap management read controller 83.

Then, the write address and the number of bytes written to be written are read from two of the memories #1–#64 of the overlap management memory 81 under the control of the overlap management memory read controller 83 and a selector controller 90 so that the short cell extending over the two ATM cell can be successively read from the data memory 87. The write address and the number of bytes to be written are then successively stored in the read address management FIFO memory 88. The read controller 70 reads the read address and the number of bytes to be read from the address management FIFO memory 88, and are applied to the data memory 87, from which the corresponding ATM cell (the short cell which was mapped in the two ATM cells is now placed in one ATM cell) is read.

As has been described above, according to the fifth to eleventh embodiments of the present invention, the short cell mapped in the ATM cell or two ATM cells can be extracted. Since the output format can be used in which the short cell is mapped in the payload field of the ATM cell as the output format, the existing ATM switch can be used to realize the present invention. Even if the short cell extends over the two ATM cells, the short cell can be mapped in the single ATM cell and can be output.

Figure 21:
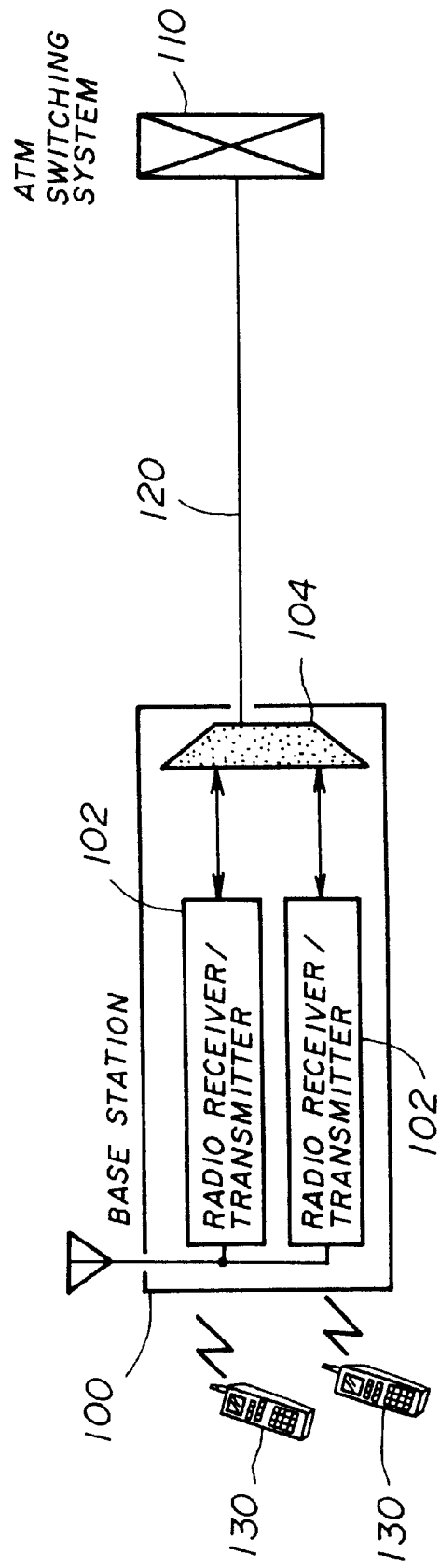
FIG. 21 is a block diagram of a system to which the present invention can be applied.

FIG. 21 is a block diagram of an application of the cell assembly and multiplexing device and the cell demultiplexing device according to the present invention. The application shown in FIG. 21 is a mobile communication system. The system includes a base station 100, an ATM switching system 110 which is connected to an ATM transmission line 120. The base station 100 includes radio receiver/transmitters 102, and a cell multiplexing/demultiplexing device 104. The device 104 includes the cell assembly and multiplexing device and the cell demultiplexing device according to the present invention. The radio receiver/transmitters 102 communicate with mobile communication devices 130 such as portable telephone sets. Since the bit rate of the radio communications is low than the bit rate of the ATM transfer carried out over the ATM transmission line 120. Hence, the short cells are assembled and multiplexed in the multiplexing/demultiplexing device, and are demultiplexed and disassembled therein. The device 104 assembles and disassembles the short cells, so that data to be transferred can be assembled in the short cells with a reduced time.

Figure 22:
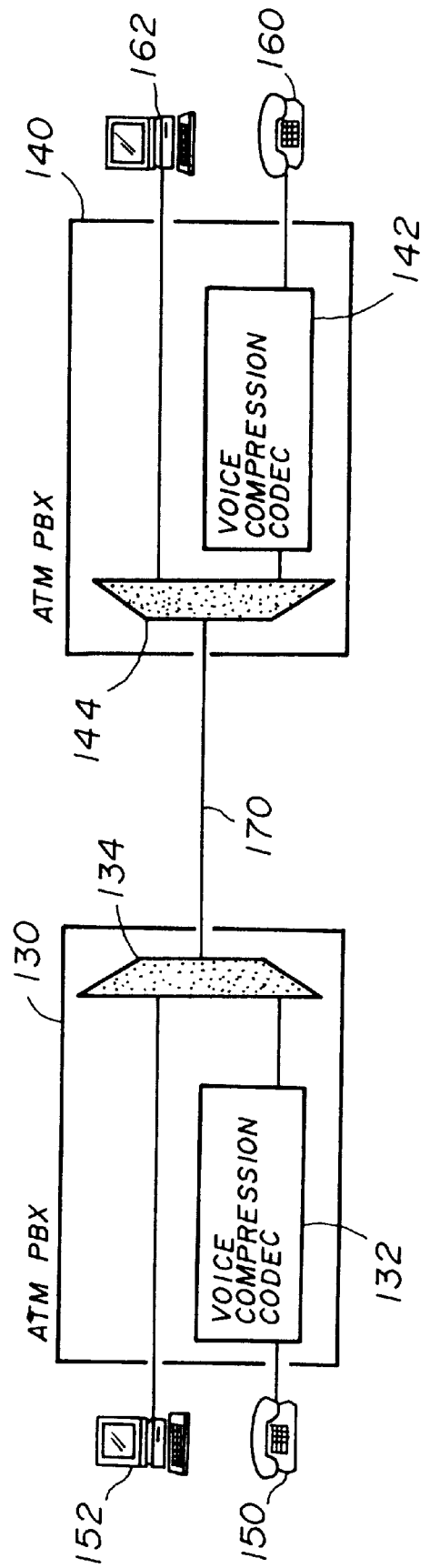
FIG. 22 is a block diagram of another system to which the present invention can be applied.

FIG. 22 is a block diagram of another application of the present invention. The application shown in FIG. 22 is a PBX trunk application, which includes ATM PBXs 130 and 140 connected together via an ATM transmission line 170. The ATM PBX 130 includes a voice compression codec (coder and decoder) 132 and a multiplexing/demultiplexing device 134. The device 134 includes the cell assembly and multiplexing device and the cell demultiplexing device according to the present invention. A low-bit-rate terminal 150 is connected to the codec 132. The terminal 150 transfers data at a low bit rate of, for example, 64 kbps. The codec 132 compresses 64 kbps data from the terminal 150 to 8 kbps data and decompresses 8 kbps data to generate 64 kbps data to be transmitted to the terminal 150. The device 134 is directly connected to a high-bit-rate terminal 152, which can be an ATM terminal.

The ATM PBX 140 includes a voice compression codec 142 and a multiplexing/demultiplexing device 144. The device 144 includes the cell assembly and multiplexing device and the cell demultiplexing device according to the present invention. A low-bit-rate terminal 160 is connected to the codec 142. The terminal 160 transfers data at a low bit rate of, for example, 64 kbps. The codec 142 compresses 64 kbps data from the terminal 160 to 8 kbps data and decompresses 8 kbps data to generate 64 kbps data to be transmitted to the terminal 150. The device 144 is directly connected to a high-bit-rate terminal 162, which can be an ATM terminal.

The bit rate of the terminals 150 and 160 is quite lower than that of the ATM transmission line 170. The devices 134 and 144 assemble and disassemble the short cells, so that data to be transferred can be assembled in the short cells with a reduced time.

In FIG. 22, the short cell assembly and multiplexing device and the short cell demultiplexing device are provided in the ATM switch main body having an ATM switch core, and a call processor for controlling the ATM switch core. Alternatively, it is possible to provide the short cell assembly and multiplexing device and the short cell demultiplexing device in trunks connected to the ATM switch main body.

Figure 23:
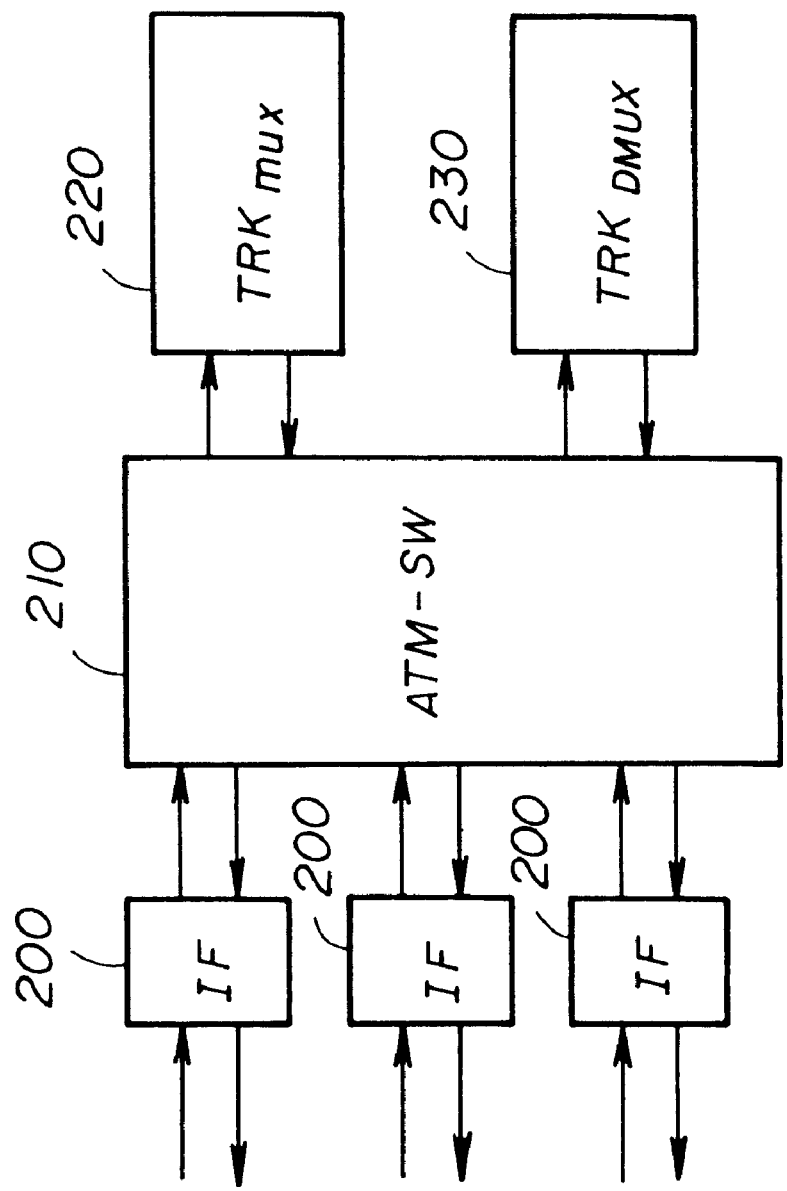
FIG. 23 is a block diagram of an arrangement in which the short cell assembly and multiplexing device and the short cell demultiplexing device of the present invention are accommodated in trunks connected to an ATM switch.

FIG. 23 is a block diagram of such an alternative arrangement. An ATM switch main body 210 includes an ATM switch core and a call processor. Transmission lines are coupled to the ATM switch main body 210 via respective interface units 200. A multiplexing trunk (TRK$_{MUX}$) 220 and a demultiplexing trunk (TRK$_{DMUX}$) 230 are connected to the ATM switch main body 210. The multiplexing trunk 220 is connected to a predetermined output port of the ATM switch main body 210, and the demultiplexing trunk 230 is connected to another predetermined output port thereof.

Figure 24:
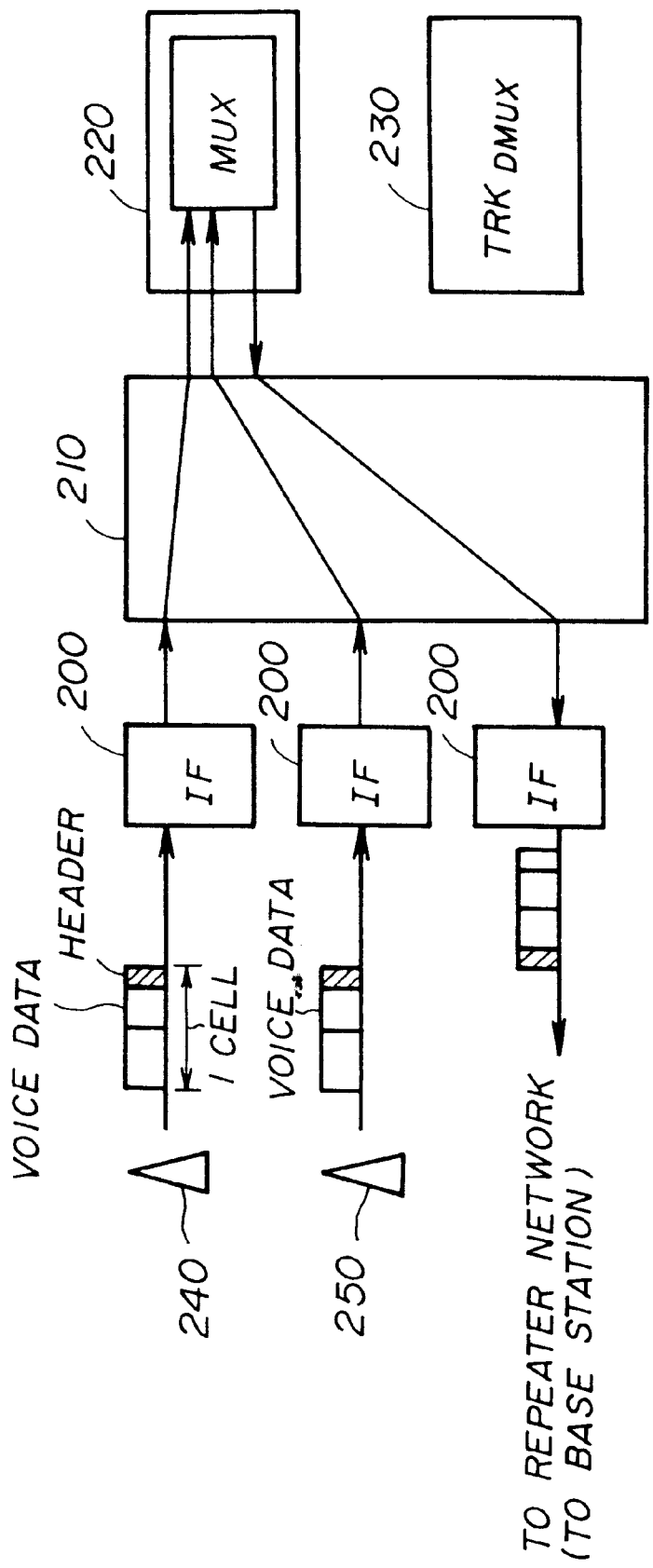
FIG. 24 is a block diagram of a multiplexing operation in the arrangement shown in FIG. 23.

As shown in FIG. 24, an ATM cell from an ATM terminal 240 is applied to the ATM switch main body 210 via the corresponding interface unit 200. The above ATM cell includes voice data. The ATM switch main body 210 refers to the VPI and VCI included in the ATM cell header of the received ATM cell, and recognizes that the received ATM cell should be routed to the multiplexing trunk 220. Similarly, an ATM cell from an ATM terminal 250 is routed to the multiplexing trunk 220. The multiplexing trunk 220 includes the aforementioned short cell assembly and multiplexing device of the present invention. The multiplexing trunk 220 multiplexes the voice data included in the received ATM cells from the ATM terminals 240 and 250, and generates an ATM cell including short cells respectively including the voice data from the ATM terminals 240 and 250. The ATM cell thus formed is then output to a repeater network or a base station via the ATM switch main body 210 and the corresponding interface unit 200.

Figure 25:
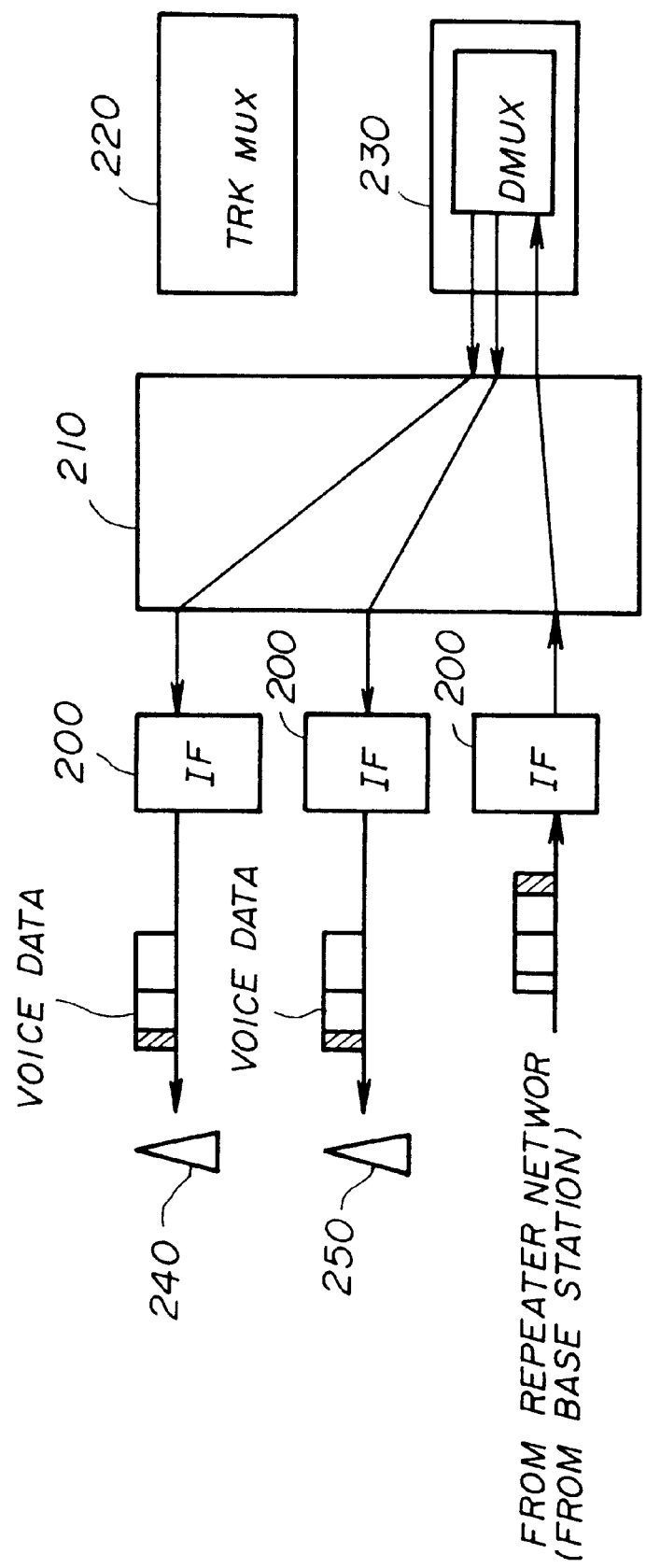
FIG. 25 is a block diagram of a demultiplexing operation in the arrangement shown in FIG. 23.

As shown in FIG. 25, an ATM cell from a repeater network or a base station is routed to the demultiplexing trunk 230 via the corresponding interface unit 200 and the ATM switch main body 210. That is, the above ATM cell includes the VPI and VCI indicative of the output port of the ATM switch main body 210 to which the demultiplexing trunk 230 is connected. The demultiplexing device 230 includes the aforementioned short cell demultiplexing device of the present invention. The demultiplexing trunk 230 refers to the short cell headers of the short cells included in the received ATM cell, and demultiplexes these short cells from each other. Then, the demultiplexed short cell are routed to the respective ATM terminals 240 and 250 by the ATM switch main body 210.

Figure 26:
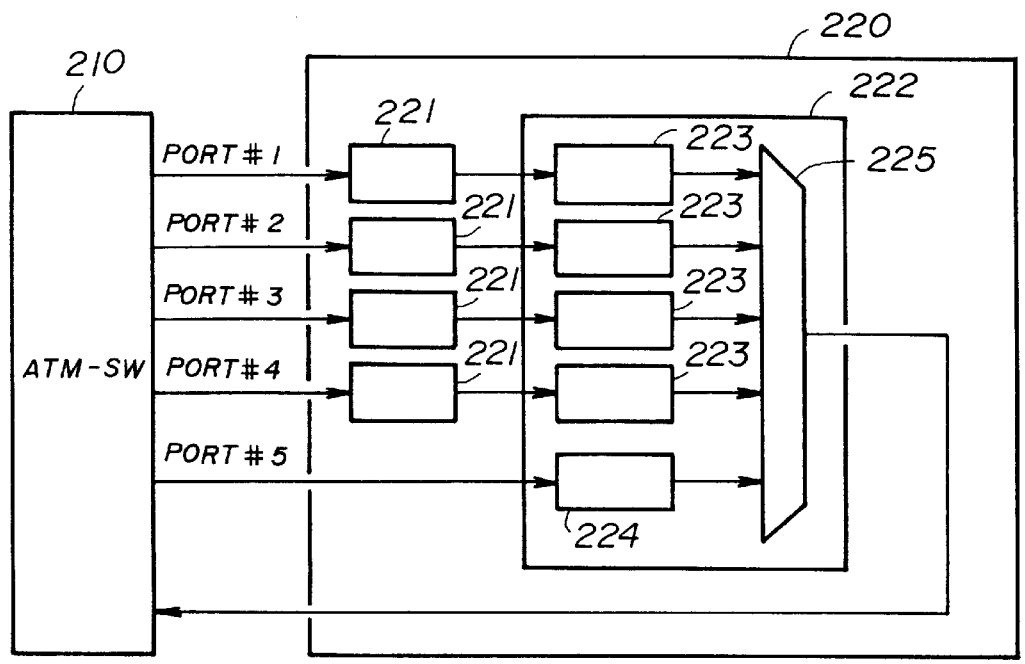
FIG. 26 is a block diagram of a configuration of a short cell assembly and multiplexing trunk shown in FIG. 23.

FIG. 26 is a block diagram of the multiplexing trunk 220, which includes voice data extractors 221 connected to ports #1–#5 of the ATM switch main body 210, and a short cell assembly and multiplexing device 222. The device 222 includes short cell assembly parts 223 respectively provided to the voice data extractors 221, an AAL processing part 224, and a multiplexer 225. The voice data extractors 221 extract voice data from the received ATM cells, and output the extracted voice data to the device 222. The voice data is located in a given position in the payload field of each ATM cell. The device 222 is configured in the same manner as shown in FIG. 6.

Figure 27:
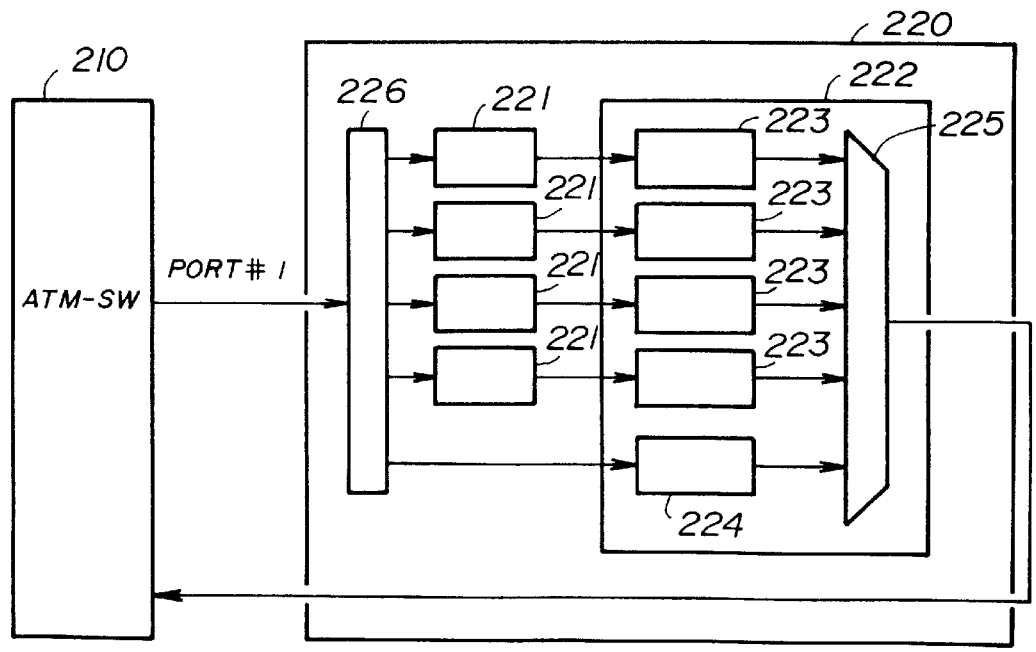
FIG. 27 is a block diagram of a variation of the configuration shown in FIG. 26.

FIG. 27 is a block diagram of a variation of the multiplexing trunk 220. In FIG. 27, parts that are the same as those shown in the previously described figures are given the same reference numbers. The multiplexing 220 includes all the components shown in FIG. 26, and further includes a distributor 226. The multiplexing trunk 220 shown in FIG. 27 is connected to only one output port of the ATM switch main body 210. The distributor 226 distributes ATM cells received from the ATM cell main body 210, and distributes them to the voice data extractors 221 by referring to the VPI and VCI data included in the received ATM cells. That is, the received ATM cells are distributed to the voice data extractors 221 on the connection base.

Figure 28:
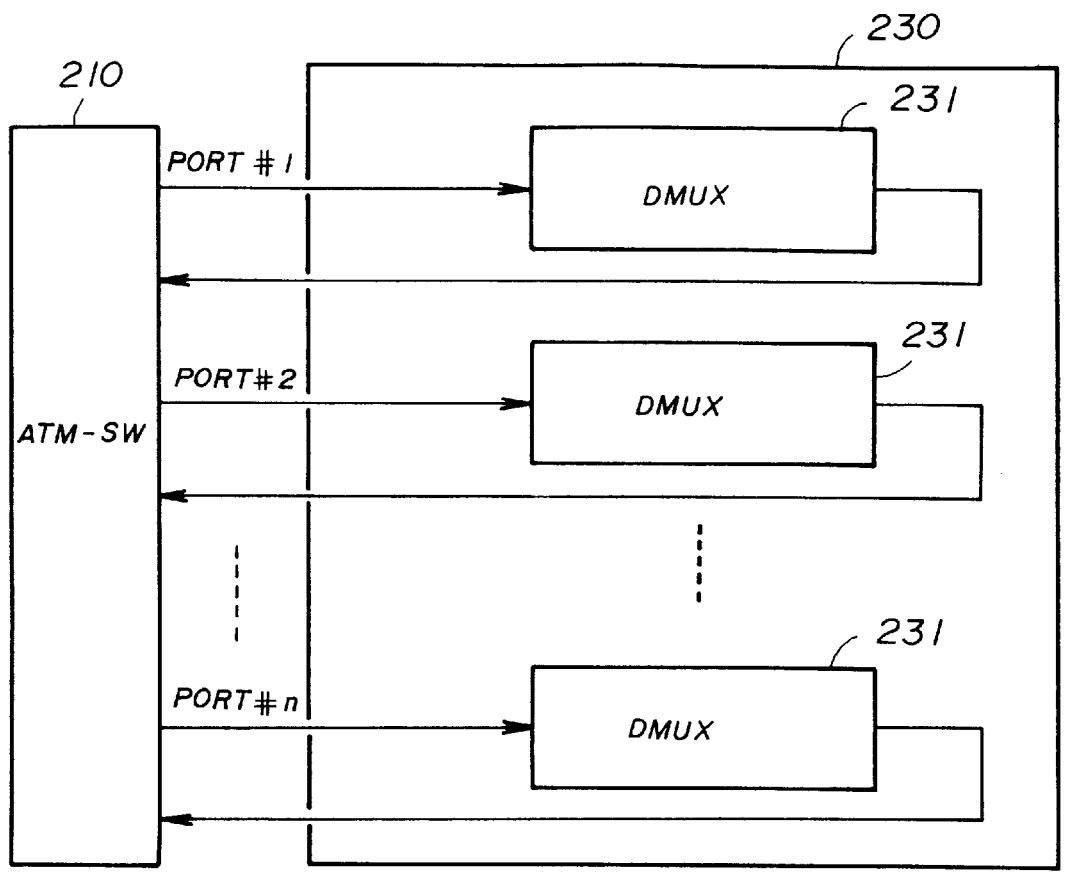
FIG. 28 is a block diagram of a configuration of a short cell demultiplexing trunk shown in FIG. 23.

FIG. 28 is a block diagram of the demultiplexing trunk 230, which includes short cell demultiplexing devices 231 respectively provided for ports #1–#n of the ATM switch main body 210. Each of the short cell demultiplexing devices 231 is capable of processing one channel and is configured as has been described previously.

Figure 29:
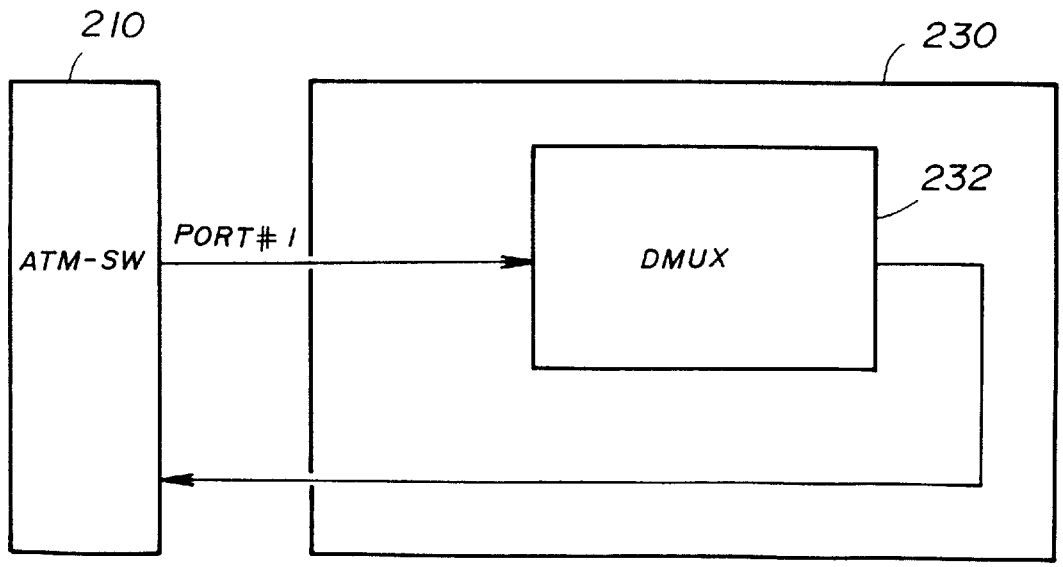
FIG. 29 is a block diagram of a variation of the configuration shown in FIG. 28.

FIG. 29 is a block diagram of a variation of the demultiplexing trunks 230, which variation includes a short cell demultiplexing device capable of processing a plurality of channels.

Figure 30:
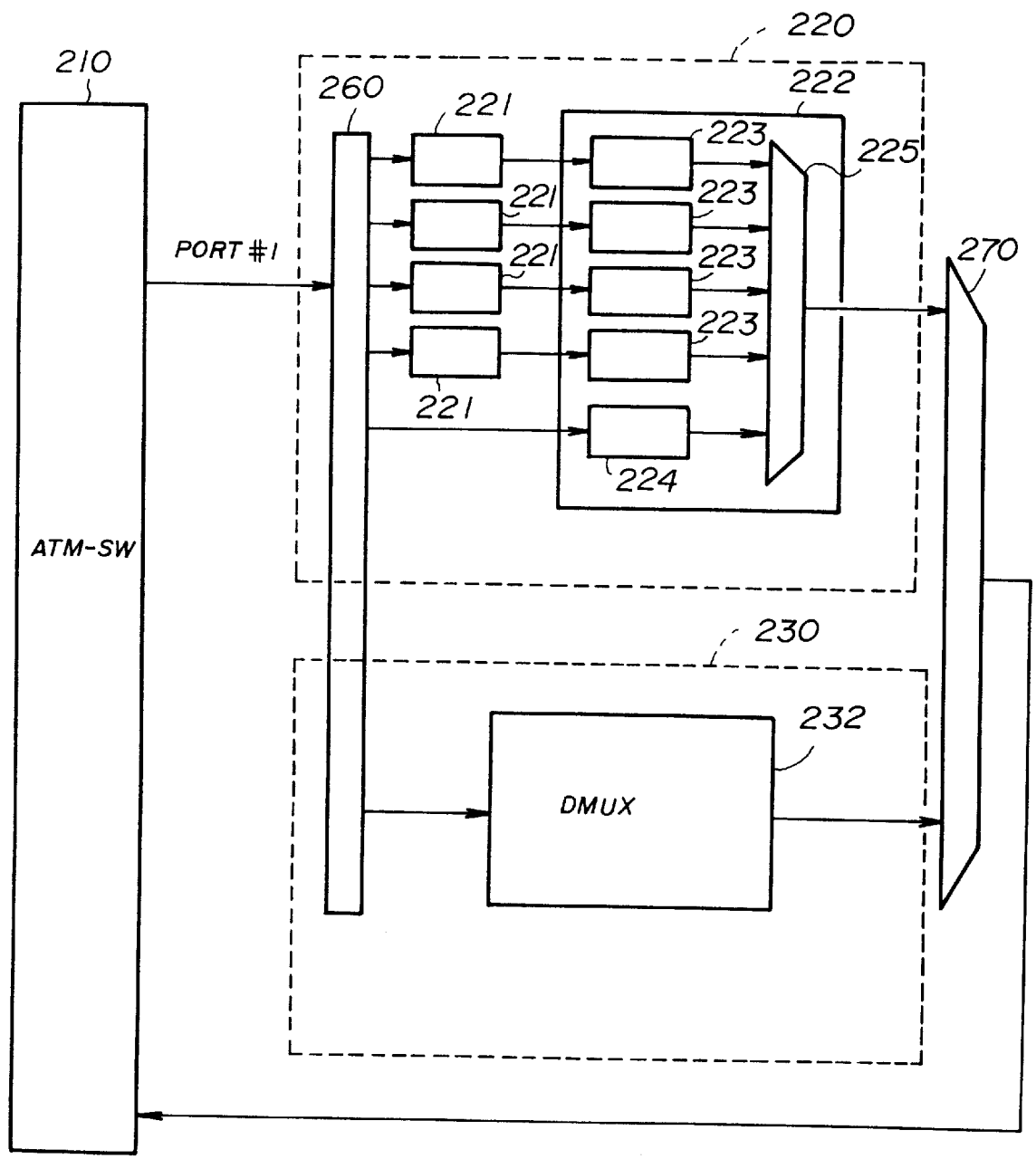
FIG. 30 is a block diagram of a configuration in which the short cell assembly and multiplexing trunk and the short cell demultiplexing trunk are connected to one output port of the ATM switch main body.

FIG. 30 is a block diagram of an arrangement in which the multiplexing trunk 220 and the demultiplexing trunk 230 are connected to one output port of the ATM cell switch main body 210. The multiplexing trunk 220 has the same configuration as shown in FIG. 26, and the demultiplexing trunk 230 has the same configuration as shown in FIG. 29. A distributor 260 is commonly provided to the multiplexing trunk 220 and the demultiplexing trunk 230. The output cells of the trunks 220 and 230 are multiplexed by a cell multiplexer 270, and is applied to an input port of the ATM switch main body 210. The distributor 260 refers to the VPI and VCI included in each ATM cell, and determines whether the received cell should be distributed to the multiplexing trunk 220 or the demultiplexing trunk 230.

The present invention is not limited to the specifically disclosed embodiments, and variations and modifications may be made without departing from the scope of the present invention.

What is claimed is:

1. A cell assembly and multiplexing device comprising:

short cell assembly parts which store input information received via respective input lines and add short cell headers to said input information so that short cells having said short cell headers are assembled; and a multiplexing part which arranges the short cells in given fields of standard cells having a given standard format and a fixed cell length and outputs the standard cells having the short cells to a transmission line, said multiplexing part including a selector which selects one of the short cell assembly parts without buffering said input information.

2. The cell assembly and multiplexing device as claimed in claim 1, further comprising a process part which is provided to another input line and arranges information received via said another input line so that standard cells including said information can be formed, wherein said multiplexing part multiplexes the standard cells assembled in said process part with the standard cells including the short cells.

3. The cell assembly and multiplexing device as claimed in claim 1, wherein said multiplexing part multiplexes standard cells transferred over another input line and stored in a buffer with the standard cells including the short cells.

4. The cell assembly and multiplexing device as claimed in claim 1, wherein said short cell assembling parts assemble the short cells for each channel multiplexed in each of the input lines in a time division multiplexing formation.

5. The cell assembly and multiplexing device as claimed in claim 1, further comprising a switch part which is provided at input sides of the short cell assembly parts and switches time slots multiplexed on the input lines in a time division multiplexing formation so that information in each of the time slots is applied to a corresponding one of the short cell assembly parts.

6. The cell assembly and multiplexing device as claimed in claim 1, further comprising a multiplexer which is provided at input sides of the short cell assembly parts and multiplexes time slots that are multiplexed on the input lines in a time division multiplexing formation.

7. The cell assembly and multiplexing device as claimed in claim 1, wherein said multiplexing part arranges the short cells in the given fields of standard cells in a given priority order.

8. A short cell demultiplexing device comprising:

a short cell discriminating part which discriminates a short cell arranged in a standard cell having a given standard format and transferred via a transmission line by referring to a short cell header of the short cell; and a short cell extracting part which extracts, from at least one standard cell, the short cell discriminated by said short cell discriminating part, wherein said short cell extracting part comprises:
   a short cell memory which stores the short cell arranged in at least one standard cell and discriminated by the short cell discriminating part;
   a write controller which performs a write control of the short cell memory; and
   a read controller which performs a read control of the short cell memory.

9. The short cell demultiplexing device as claimed in claim 8, further comprising a connection setting memory which stores information concerning a connection which is set for each call, wherein said write controller performs the write control of the short cell memory when connection setting information included in a header of the standard cell applied to said short cell discriminating part coincides with the information stored in said connection setting memory.

10. The short cell demultiplexing device as claimed in claim 9, wherein further comprising an error check part which determines whether a given continuity of standard cells received is satisfied and concludes that an error of a transfer of the standard cells occurs if it is determined that the given continuity is not satisfied.

11. The short cell demultiplexing device as claimed in claim 9, further comprising a cell assembly part which arranges the short cell read from the short cell memory in a given field of a standard cell to be output from the short cell demultiplexing device by referring to control information necessary to arrange the short cell in the cell assembly part, said control information relating to the information concerning the connection which is set for each cell and stored in said connection setting memory.

12. The short cell demultiplexing device as claimed in claim 8, further comprising a cell assembly part which arranges the short cell read from the short cell memory in a given field of a standard cell to be output from the short cell demultiplexing device.

13. The short cell demultiplexing device as claimed in claim 9, further comprising:

an overlap detection part which detects a short cell which extends over two standard cells; and a control part which controls said write controller and said read controller so that separated parts of the short cell detected by said overlap detection part are successively written into said short cell memory and read therefrom.

* * * * *

UNITED STATES PATENT AND TRADEMARK OFFICE
CERTIFICATE OF CORRECTION

PATENT NO. : 6,021,135
DATED : February 1, 2000
INVENTOR(S) : Tomohiro Ishihara et al.

It is certified that error appears in the above-identified patent and that said Letters Patent is hereby corrected as shown below:

Column 4,
Line 22, change "cell" to -- call --.

Column 18,
Line 41, change "cell" to -- call --.

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,021,135                                    Page 1 of 1
DATED         : February 1, 2000
INVENTOR(S)   : Ishihara et al.

It is certified that error appears in the above-identified patent and that said Letters Patent is hereby corrected as shown below:

<u>Title page,</u>
Item [56], FOREIGN PATENT DOCUMENTS,
-- WO96/26589      8/96    PCT
   WO96/34478     10/96    PCT --

Signed and Sealed this

Nineteenth Day of August, 2003

JAMES E. ROGAN
*Director of the United States Patent and Trademark Office*